United States Patent
Yu et al.

(10) Patent No.: US 12,245,214 B2
(45) Date of Patent: Mar. 4, 2025

(54) INFORMATION TRANSMISSION METHOD AND COMMUNICATIONS DEVICE

(71) Applicant: HUAWEI TECHNOLOGIES CO., LTD., Guangdong (CN)

(72) Inventors: Zheng Yu, Beijing (CN); Wenping Bi, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 441 days.

(21) Appl. No.: 17/513,633

(22) Filed: Oct. 28, 2021

(65) Prior Publication Data

US 2022/0053508 A1    Feb. 17, 2022

Related U.S. Application Data

(63) Continuation of application No. PCT/CN2019/085204, filed on Apr. 30, 2019.

(51) Int. Cl.
    *H04W 72/12*      (2023.01)
(52) U.S. Cl.
    CPC .................. *H04W 72/12* (2013.01)
(58) Field of Classification Search
    CPC ............ H04W 72/12; H04W 72/23; H04W 72/0446; H04W 72/231; H04W 72/232;
    (Continued)

(56) References Cited

U.S. PATENT DOCUMENTS

2015/0215930 A1* 7/2015 Kim .................. H04B 7/0626
                                            370/329
2018/0049229 A1   2/2018 Dinan et al.
(Continued)

FOREIGN PATENT DOCUMENTS

CN       101151932 A      3/2008
CN       107950065 A      4/2018
(Continued)

OTHER PUBLICATIONS

"Initial Transmission Opportunity in UL Configured Grant" 3GPP TSG-RAN WG1 Meeting #96 Athens, Greece, Feb. 25-Mar. 1, 2019 (R1-1901603) (Year: 2019).*

(Continued)

*Primary Examiner* — Sun Jong Kim
(74) *Attorney, Agent, or Firm* — Fish & Richardson P.C.

(57) ABSTRACT

The present disclosure relates to information transmission methods and communications devices. In one example method, a first communications device receives control information sent by a second communications device, where the control information is used to schedule a plurality of transport blocks (TBs). The first communications device determines a first value, where the first value is associated with one or more of a frequency hopping configuration parameter, a redundancy version (RV) change parameter, an interleaving gap parameter, and a quantity of transport blocks. The first communications device determines a first start time unit during transmission of a first TB, where the first TB is at least one of the plurality of TBs scheduled by the control information, and an index of the first start time unit is an integer multiple of the first value. The first communications device transmits the first TB based on the determined first start time unit.

12 Claims, 8 Drawing Sheets

(58) Field of Classification Search
CPC ..... H04W 72/40; H04W 72/50; H04W 72/51; H04W 72/512; H04L 5/0094; H04L 5/0012; H04L 5/0082

See application file for complete search history.

(56) References Cited

U.S. PATENT DOCUMENTS

| | | | |
|---|---|---|---|
| 2018/0124815 | A1 | 5/2018 | Papasakellariou |
| 2018/0219576 | A1 | 8/2018 | Bhattad et al. |
| 2019/0052416 | A1 | 2/2019 | Babaei et al. |
| 2022/0038208 | A1* | 2/2022 | Yan ................... H04W 72/23 |
| 2022/0368465 | A1* | 11/2022 | Wong ................. H04L 1/1812 |

FOREIGN PATENT DOCUMENTS

| | | |
|---|---|---|
| CN | 109152072 A | 1/2019 |
| CN | 109155727 A | 1/2019 |
| CN | 109391440 A | 2/2019 |

OTHER PUBLICATIONS

3gpp ts 36.212 V15.5.0 (mAR. 2019), "3rd Generation Partnership Project; Technical Specification Group Radio Access Network;Evolved Universal Terrestrial Radio Access (E-UTRA); Multiplexing and channel coding(Release 15)," Mar. 2019, 246 pages.

3GPP TS 36.331 V15.5.1 (Apr. 2019), "3rd Generation Partnership Project; Technical Specification Group Radio Access Network;Evolved Universal Terrestrial Radio Access (E-UTRA); Radio Resource Control (RRC);Protocol specification (Release 15)," Apr. 2019, 948 pages.

Huawei et al., "Scheduling of multiple transport blocks," 3GPP TSG RAN WG1 Meeting #96, R1-1901510, Athens, Greece, Feb. 25-Mar. 1, 2019, 8 pages.

PCT International Search Report and Written Opinion issued in International Application No. PCT/CN2019/085204 on Jan. 21, 2020, 16 pages (with English translation).

Samsung, "Discussion on scheduling of multiple TBs for MTC," 3GPP TSG RAN WG1 Meeting #94, R1-1808732, Gothenburg, Sweden, Aug. 20-24, 2018, 6 pages.

Ericsson, "Initial Transmission Opportunity in UL Configured Grant," 3GPP TSG-RAN WG1 Meeting #96, R1-1901603, Athens, Greece, Feb. 25-Mar. 1, 2019, 3 pages.

EPO Partial Supplementary European Search Report issued in European Application No. 19927111.5 on Mar. 24, 2022, 13 pages.

Huawei, HiSilicon, "Scheduling of Multiple Transport Blocks," 3GPP TSG RAN WG1 Meeting #96bis, R1-1903917, Xi'an, China, Apr. 8-12, 2019, 7 pages.

Sierra Wireless, "LTE-M Multiple Transport Block Grant Design Considerations," 3GPP TSG RAN WG1 Meeting #96bis, R1-1903907, Xi'an, China, Apr. 8-12, 2019, 13 pages.

ZTE, "Consideration on scheduling enhancement for MTC," 3GPP TSG RAN WG1 Meeting #96bis, R1-1904344, Xi'an, China, Apr. 8-12, 2019, 8 pages.

* cited by examiner

INFORMATION TRANSMISSION METHOD AND COMMUNICATIONS DEVICE

CROSS-REFERENCE TO RELATED APPLICATIONS

This application is a continuation of International Application No. PCT/CN2019/085204, filed on Apr. 30, 2019, the disclosure of which is hereby incorporated by reference in its entirety.

TECHNICAL FIELD

Embodiments of this application relate to the communications field, and in particular, to an information transmission method and a communications device.

BACKGROUND

A base station can send control information, to implement scheduling and transmission of user data. In a communications system, one piece of downlink control information (downlink control information, DCI) is usually used to schedule one transport block (transport block, TB) carried on a data channel. The data channel may be a physical downlink shared channel (physical downlink shared channel, PDSCH) or a physical uplink shared channel (physical uplink shared channel, PUSCH).

For an enhanced machine type communication (enhanced machine type communication, eMTC) user, because the user is located in an area with poor coverage, both control information and data information need to be repeated for a specific quantity of times to reach a specific coverage scope. When user data is large or regular, to reduce DCI transmission overheads, one piece of DCI may be used to schedule a plurality of data channels, or one piece of DCI may be used to schedule a plurality of transport blocks.

In a transmission process of a transport block, a frequency hopping manner may be used. For example, the transport block is transmitted in a plurality of consecutive subframes, and the transport block continues to be transmitted by hopping from one narrowband to another narrowband at a frequency hopping switching point.

When the DCI is used to schedule the plurality of transport blocks, interleaving transmission is performed between the plurality of transport blocks. This may increase a time diversity gain during transmission of the plurality of transport blocks.

When the plurality of transport blocks are interleaved, a time point at which one transport block changes to another transport block may not be aligned with the frequency hopping switching point, and data transmission performance is low.

SUMMARY

Embodiments of this application provide an information transmission method and a communications device, to align a start time unit of a transport block with a frequency hopping switching point, to combine repeated transmission in different time units, and improve data transmission performance.

To resolve the foregoing technical problems, the embodiments of this application provide the following technical solutions.

According to a first aspect, an embodiment of this application provides an information transmission method, including: A first communications device receives control information sent by a second communications device, where the control information is used to schedule a plurality of transport blocks TBs; the first communications device determines a first value, where the first value is associated with one or more of a frequency hopping configuration parameter, a redundancy version RV change parameter, an interleaving gap parameter, and a quantity of transport blocks; the first communications device determines a first start time unit during transmission of a first TB, where the first TB is at least one of the plurality of TBs scheduled by the control information, and an index of the first start time unit is an integer multiple of the first value; and the first communications device transmits the first TB based on the determined first start time unit.

In this embodiment of this application, the first communications device receives the control information sent by the second communications device. The control information is used to schedule the plurality of transport blocks TBs. The first communications device determines the first value. The first value is associated with one or more of the frequency hopping configuration parameter, the redundancy version RV change parameter, the interleaving gap parameter, and the quantity of transport blocks. For example, the first value may be a product of a frequency hopping gap and the quantity of transport blocks, or the first value may be a product of an RV change gap and the quantity of transport blocks. The first communications device determines the first start time unit during the transmission of the first TB. The first TB is the at least one of the plurality of TBs scheduled by the control information, and the index of the first start time unit is an integer multiple of the first value. The first communications device transmits the first TB based on the determined first start time unit. In this embodiment of this application, the index of the first start time unit, corresponding to the first TB is an integer multiple of a first parameter. Therefore, a time point at which the TB changes (or switches) is aligned with a frequency hopping switching point. In this way, transmission, in different subframes, of a same TB is distributed on a same frequency band. Therefore, repeated transmission in different subframes can be combined, and data transmission performance is improved.

In a possible design, that the first communications device transmits the first TB based on the determined first start time unit includes: The first communications device determines, based on an end time unit of a control channel and a preset first delay, a second start time unit during the transmission of the first TB; and the first communications device transmits the first TB based on first indication information included in the control information, where the first indication information indicates that the first TB is transmitted in a first manner or a second manner. The first manner includes: If the second start time unit is not an integer multiple of the first value, the transmission of the first TB is delayed to the first start time unit closest to the second start time unit, to transmit the first TB; and if the second start time unit is an integer multiple of the first value, the second start time unit is equal to the first start time unit, and the first TB is transmitted based on the first start time unit. The second manner includes: The first TB is transmitted based on the second start time unit.

The control information sent by the second communications device may include the first indication information, and the first indication information is used to indicate a transmission manner used for the first TB. For example, when a value of the first indication information is 0, the first manner is used for the transmission, and when a value of the first indication information is 1, the second manner is used for the transmission. For example, when the plurality of TBs are scheduled by one piece of the control information, and when the plurality of TBs are interleaved, time points at which the TBs change (or switch) may not be aligned with the frequency hopping switching point. Therefore, repeated transmission in different subframes cannot be combined, and data transmission performance is affected. To resolve a problem that repeatedly transmitted subframes cannot be combined because different subframes cannot be aligned, in this embodiment of this application, when DCI is used to schedule a plurality of TBs, one piece of first information is indicated. The plurality of TBs are transmitted based on the first information. For example, the first information includes one bit. A bit status being 1 indicates that a start subframe of the transmission of the plurality of TBs is determined in the first manner. For example, the first manner is: A subframe S' of the transmission of the plurality of TBs is first determined based on an end subframe of the control channel and the first delay, and a subframe obtained after S' is delayed by X subframes is used as the start subframe S, so that the subframe S meets S=N*M. A bit status being 0 indicates that a start subframe of the transmission of the plurality of TBs is determined in the second manner. The second manner is: The start subframe of the transmission of the plurality of TBs is determined based on an end subframe of the control channel and the first delay. Definition of M is the same as above.

In a possible design, the method further includes: The first communications device determines, based on an end time unit of a control channel and a preset first delay, a second start time unit during the transmission of the first TB. If the second start time unit is not an integer multiple of the first value, the transmission of the first TB is delayed to the first start time unit closest to the second start time unit, to transmit the first TB. A time point at which the TB changes (or switches) is aligned with a frequency hopping switching point. In this way, transmission, in different subframes, of a same TB is distributed on a same frequency band. Therefore, repeated transmission in different subframes can be combined, and data transmission performance is improved.

According to a second aspect, an embodiment of this application further provides an information transmission method, including: A second communications device sends control information to a first communications device, where the control information is used to schedule a plurality of transport blocks TBs; the second communications device determines a first value, where the first value is associated with one or more of a frequency hopping configuration parameter, a redundancy version RV change parameter, an interleaving gap parameter, and a quantity of transport blocks; the second communications device determines a first start time unit during transmission of a first TB, where the first TB is at least one of the plurality of TBs scheduled by the control information, and an index of the first start time unit is an integer multiple of the first value; and the second communications device transmits the first TB based on the determined first start time unit.

In a possible design, that the second communications device transmits the first TB based on the determined first start time unit includes: The second communications device determines, based on an end time unit of a control channel and a preset first delay, a second start time unit during the transmission of the first TB; and the second communications device transmits the first TB based on first indication information included in the control information, where the first indication information indicates that the first TB is transmitted in a first manner or a second manner. The first manner includes: If the second start time unit is not an integer multiple of the first value, the transmission of the first TB is delayed to the first start time unit closest to the second start time unit, to transmit the first TB; and if the second start time unit is an integer multiple of the first value, the second start time unit is equal to the first start time unit, and the first TB is transmitted based on the first start time unit. The second manner includes: The first TB is transmitted based on the second start time unit.

In a possible design, the method further includes: The second communications device determines, based on an end time unit of a control channel and a preset first delay, a second start time unit during the transmission of the first TB. If the second start time unit is not an integer multiple of the first value, the transmission of the first TB is delayed to the first start time unit closest to the second start time unit, to transmit the first TB.

According to a third aspect, an embodiment of this application further provides a communications device. The communications device is specifically a first communications device, and the first communications device includes a processing module and a transceiver module.

The transceiver module is configured to receive control information sent by a second communications device. The control information is used to schedule a plurality of transport blocks TBs.

The processing module is configured to determine a first value. The first value is associated with one or more of a frequency hopping configuration parameter, a redundancy version RV change parameter, an interleaving gap parameter, and a quantity of transport blocks.

The processing module is configured to determine a first start time unit during transmission of a first TB. The first TB is at least one of the plurality of TBs scheduled by the control information, and an index of the first start time unit is an integer multiple of the first value.

The processing module is configured to transmit, by using the transceiver module, the first TB based on the determined first start time unit.

In a possible design, the processing module is configured to: determine, based on an end time unit of a control channel and a preset first delay, a second start time unit during the transmission of the first TB; and transmit the first TB based on first indication information included in the control information. The first indication information indicates that the first TB is transmitted in a first manner or a second manner.

The first manner includes: If the second start time unit is not an integer multiple of the first value, the transmission of the first TB is delayed to the first start time unit closest to the second start time unit, to transmit the first TB; and if the second start time unit is an integer multiple of the first value, the second start time unit is equal to the first start time unit, and the first TB is transmitted based on the first start time unit.

The second manner includes: The first TB is transmitted based on the second start time unit.

In a possible design, the processing module is configured to determine, based on an end time unit of a control channel and a preset first delay, a second start time unit during the transmission of the first TB. If the second start time unit is not an integer multiple of the first value, the transmission of the first TB is delayed to the first start time unit closest to the second start time unit, to transmit the first TB.

In the third aspect of this application, the modules constituting the communications device may further perform the steps described in the first aspect and the possible implementations. For details, refer to the description in the first aspect and the possible implementations.

According to a fourth aspect, an embodiment of this application further provides a communications device. The communications device is specifically a second communications device, and the second communications device includes a processing module and a transceiver module.

The transceiver module is configured to send control information to a first communications device. The control information is used to schedule a plurality of transport blocks TBs.

The processing module is configured to determine a first value. The first value is associated with one or more of a frequency hopping configuration parameter, a redundancy version RV change parameter, an interleaving gap parameter, and a quantity of transport blocks.

The processing module is configured to determine a first start time unit during transmission of a first TB. The first TB is at least one of the plurality of TBs scheduled by the control information, and an index of the first start time unit is an integer multiple of the first value.

The processing module is configured to transmit the first TB based on the determined first start time unit.

In a possible design, the processing module is configured to: determine, based on an end time unit of a control channel and a preset first delay, a second start time unit during the transmission of the first TB; and transmit the first TB based on first indication information included in the control information. The first indication information indicates that the first TB is transmitted in a first manner or a second manner.

The first manner includes: If the second start time unit is not an integer multiple of the first value, the transmission of the first TB is delayed to the first start time unit closest to the second start time unit, to transmit the first TB; and if the second start time unit is an integer multiple of the first value, the second start time unit is equal to the first start time unit, and the first TB is transmitted based on the first start time unit.

The second manner includes: The first TB is transmitted based on the second start time unit.

In a possible design, the processing module is configured to determine, based on an end time unit of a control channel and a preset first delay, a second start time unit during the transmission of the first TB. If the second start time unit is not an integer multiple of the first value, the transmission of the first TB is delayed to the first start time unit closest to the second start time unit, to transmit the first TB.

In the fourth aspect of this application, the modules constituting the communications device may further perform the steps described in the second aspect and the possible implementations. For details, refer to the description in the second aspect and the possible implementations.

According to a fifth aspect, an embodiment of this application further provides an information transmission method, including: A first communications device receives control information sent by a second communications device, where the control information is used to schedule a plurality of transport blocks TBs; when the control information enables frequency hopping, the first communications device determines a narrowband for transmitting a first TB in each time unit used during transmission of the first TB, where the first TB is at least one of the plurality of TBs scheduled by the control information; if a quantity of narrowbands performing frequency hopping is an even quantity and an odd quantity of TBs are scheduled by the control information, the first communications device determines, according to a first frequency hopping rule, the narrowband for transmitting the first TB in each time unit used during the transmission of the first TB; and if a quantity of narrowbands performing frequency hopping is an even quantity and an even quantity of TBs are scheduled by the control information, the first communications device determines, according to a second frequency hopping rule, the narrowband for transmitting the first TB in each time unit used during the transmission of the first TB. The first frequency hopping rule is: A narrowband index is determined according to a function $F1(x)$. The second frequency hopping rule is: A narrowband index is determined according to a function $F2(x, y)$. $x$ is one or more parameters used in the function, and the parameter includes a variable and/or a constant. $y$ is a predefined constant, or $y$ is a constant determined based on at least one of the quantity of narrowbands performing frequency hopping and the quantity of TBs scheduled by the control information.

According to a sixth aspect, an embodiment of this application further provides an information transmission method, including: A second communications device sends control information to a first communications device, where the control information is used to schedule a plurality of transport blocks TBs; when the control information enables frequency hopping, the second communications device determines a narrowband for transmitting a first TB in each time unit used during transmission of the first TB in each time unit, used to transmit the first TB, where the first TB is at least one of the plurality of TBs scheduled by the control information; if a quantity of narrowbands performing frequency hopping is an even quantity and an odd quantity of TBs are scheduled by the control information, the second communications device determines, according to a first frequency hopping rule, the narrowband for transmitting the first TB in each time unit used during the transmission of the first TB in each time unit, used to transmit the first TB; and if a quantity of narrowbands performing frequency hopping is an even quantity and an even quantity of TBs are scheduled by the control information, the second communications device determines, according to a second frequency hopping rule, the narrowband for transmitting the first TB in each time unit used during the transmission of the first TB. The first frequency hopping rule is: A narrowband index is determined according to a function $F1(x)$. The second frequency hopping rule is: A narrowband index is determined according to a function $F2(x, y)$. $x$ is one or more parameters used in the function, and the parameter includes a variable and/or a constant. $y$ is a predefined constant, or $y$ is a constant determined based on at least one of the quantity of narrowbands performing frequency hopping and the quantity of TBs scheduled by the control information.

In a possible design, the first frequency hopping rule is:

$$n_{NB}^{(i)} = \left(n_{NB}^{(i_0)} + \left(\left\lfloor \frac{i+i_\Delta}{N_{NB}^{ch}} \right\rfloor - j_0\right) \mod N_{NB,hop}^{ch}\right) \cdot f_{NE,hop} \mod N_{NB}$$

$$j_0 = \lfloor (i_0 + i_\Delta)/N_{NB}^{ch} \rfloor$$

$$i_0 \le i \le i_0 + N_{abs}^{PxSCH} - 1$$

$$i_\Delta = \begin{cases} 0, & \text{Frame structure type 1} \\ N_{NB}^{ch} - 2, & \text{Frame structure type 2} \end{cases}$$

The second frequency hopping rule is:

$$n_{NB}^{(i)} = \left(n_{NB}^{(i_0)} + \left(\left\lfloor \frac{i+i_\Delta}{N_{NB}^{ch}} \right\rfloor - j_0\right) \mod N_{NB,hop}^{ch}\right) \cdot f_{NB,hop} +$$

-continued $$\left(\left(\left\lfloor \frac{i+i_\Delta}{N_{NB}^{ch}} - j_0 \right\rfloor \middle/ y \right) \bmod N_{NB,hop}^{ch}\right) \cdot f_{NB,hop}\right) \bmod N_{NB}$$

$$j_0 = \lfloor (i_0 + i_\Delta)/N_{NB}^{ch} \rfloor$$

$$i_0 \le i \le i_0 + N_{abs}^{PxSCH} - 1$$

$$i_\Delta = \begin{cases} 0, & \text{Frame structure type 1} \\ N_{NB}^{ch} - 2, & \text{Frame structure type 2} \end{cases}.$$

Alternatively, the first frequency hopping rule is:

$$n_{NB}^{(i)} = \begin{cases} n_{NB}^{(i_0)} & \text{if } \lfloor i/N_{NB}^{ch} - j_0 \rfloor \bmod 2 = 0 \\ (n_{NB}^{(i_0)} + f_{NB,hop}) \bmod N_{NB} & \text{if } \lfloor i/N_{NB}^{ch} - j_0 \rfloor \bmod 2 = 1 \end{cases}$$

$$j_0 = \lfloor i_0/N_{NB}^{ch} \rfloor$$

$$i_0 \le i \le i_0 + N_{abs}^{PxSCH} - 1.$$

The second frequency hopping rule is:

$$n_{NB}^{(i)} =$$

$$\begin{cases} \left(n_{NB}^{(i_0)} + \left(\left(\left\lfloor \frac{i}{N_{NB}^{ch}} - j_0 \right\rfloor \middle/ y \right) \bmod 2\right) \cdot f_{NB,hop}\right) \bmod N_{NB} & \text{if } \lfloor i/N_{NB}^{ch} - j_0 \rfloor \bmod 2 = 0 \\ \left(n_{NB}^{(i_0)} + f_{NB,hop} + \left(\left(\left\lfloor \frac{i}{N_{NB}^{ch}} - j_0 \right\rfloor \middle/ y \right) \bmod 2\right) \cdot f_{NB,hop}\right) \bmod N_{NB} & \text{if } \lfloor i/N_{NB}^{ch} - j_0 \rfloor \bmod 2 = 1 \end{cases}$$

$$j_0 = \lfloor i_0/N_{NB}^{ch} \rfloor$$

$$i_0 \le i \le i_0 + N_{abs}^{PxSCH} - 1.$$

$n_{NB}^{(i)}$ is a narrowband index used when the first TB is transmitted in a time unit i.

$n_{NB}^{(i_0)}$ is a narrowband index used when the first TB is transmitted in a time unit $i_0$.

$N_{NB}^{ch}$ is a quantity of consecutive absolute time units, and during frequency hopping to another narrowband, the first TB is transmitted over a same narrowband in the $N_{NB}^{ch}$ consecutive absolute time units.

$N_{NB,hop}^{ch}$ is a quantity of narrowbands performing frequency hopping.

$f_{NB,hop}$ is a narrowband offset for frequency hopping between one narrowband and another narrowband.

$N_{NB}$ is a quantity of narrowbands in bandwidth.

$N_{abs}^{PxSCH}$ is a quantity of time units associated with the first TB transmitted over a PxSCH, and the PxSCH may be a physical uplink shared channel or a physical downlink shared channel.

mod is a modulo operation.

According to a seventh aspect, an embodiment of this application further provides a communications device. The communications device is specifically a first communications device, and the first communications device includes a processing module and a transceiver module.

The transceiver module is configured to receive control information sent by a second communications device. The control information is used to schedule a plurality of transport blocks TBs.

The processing module is configured to: when the control information enables frequency hopping, determine a narrowband for transmitting a first TB in each time unit used during transmission of the first TB. The first TB is at least one of the plurality of TBs scheduled by the control information.

The processing module is configured to: if a quantity of narrowbands performing frequency hopping is an even quantity and an odd quantity of TBs are scheduled by the control information, determine, according to a first frequency hopping rule, the narrowband for transmitting the first TB in each time unit used during the transmission of the first TB.

The processing module is configured to: if a quantity of narrowbands performing frequency hopping is an even quantity and an even quantity of TBs are scheduled by the control information, determine, according to a second frequency hopping rule, the narrowband for transmitting the first TB in each time unit used during the transmission of the first TB.

The first frequency hopping rule is: A narrowband index is determined according to a function F1(x).

The second frequency hopping rule is: A narrowband index is determined according to a function F2(x, y).

x is one or more parameters used in the function, and the parameter includes a variable and/or a constant.

y is a predefined constant, or y is a constant determined based on at least one of the quantity of narrowbands performing frequency hopping and the quantity of TBs scheduled by the control information.

In the seventh aspect of this application, the modules constituting the communications device may further perform the steps described in the fifth aspect and the possible implementations. For details, refer to the description in the fifth aspect and the possible implementations.

According to an eighth aspect, an embodiment of this application further provides a communications device. The communications device is specifically a second communications device, and the second communications device includes a processing module and a transceiver module.

The processing module is configured to send control information to a first communications device. The control information is used to schedule a plurality of transport blocks TBs.

The processing module is configured to: when the control information enables frequency hopping, determine a narrowband for transmitting a first TB in each time unit used during transmission of the first TB. The first TB is at least one of the plurality of TBs scheduled by the control information.

The processing module is configured to: if a quantity of narrowbands performing frequency hopping is an even quantity and an odd quantity of TBs are scheduled by the control information, determine, according to a first frequency hopping rule, the narrowband for transmitting the first TB in each time unit used during the transmission of the first TB.

The processing module is configured to: if a quantity of narrowbands performing frequency hopping is an even quantity and an even quantity of TBs are scheduled by the control information, determine, according to a second frequency hopping rule, the narrowband for transmitting the first TB in each time unit used during the transmission of the first TB.

The first frequency hopping rule is: A narrowband index is determined according to a function $F1(x)$.

The second frequency hopping rule is: A narrowband index is determined according to a function $F2(x, y)$.

x is one or more parameters used in the function, and the parameter includes a variable and/or a constant.

y is a predefined constant, or y is a constant determined based on at least one of the quantity of narrowbands performing frequency hopping and the quantity of TBs scheduled by the control information.

In the eighth aspect of this application, the modules constituting the communications device may further perform the steps described in the sixth aspect and the possible implementations. For details, refer to the description in the sixth aspect and the possible implementations.

According to a ninth aspect, an embodiment of this application further provides an information transmission method, including:

the first communications device receives control information sent by a second communications device, where the control information is used to schedule a plurality of transport blocks TBs;

the first communications device determines a first parameter, and uses or does not use, based on the first parameter, discontinuous transmission of a plurality of TBs; and the first communications device transmits, based on the first parameter, the plurality of TBs on transmission resources used for the transmission of the plurality of TBs.

According to a tenth aspect, an embodiment of this application further provides an information transmission method, including:

the second communications device sends control information to a first communications device, where the control information is used to schedule a plurality of transport blocks TBs;

the second communications device determines a first parameter, and uses or does not use, based on the first parameter, discontinuous transmission of a plurality of TBs; and the second communications device transmits, based on the first parameter, the plurality of TBs on transmission resources used for the transmission of the plurality of TBs.

In a possible design, when discontinuous transmission of the plurality of TBs is used, any one of the plurality of TBs is not transmitted from a first time unit to a second time unit. An index of the first time unit is an integer multiple of a second value, and/or a quantity of time units included in the first time unit to the second time unit is an integer multiple of the second value. The second value is associated with one or more of a frequency hopping configuration parameter, a redundancy version RV change parameter, an interleaving gap parameter, and a quantity of transport blocks.

According to an eleventh aspect, an embodiment of this application further provides a communications device. The communications device is specifically a first communications device, and the first communications device includes a processing module and a transceiver module.

The first communications device receives control information sent by a second communications device. The control information is used to schedule a plurality of transport blocks TBs.

The first communications device determines a first parameter, and uses or does not use, based on the first parameter, discontinuous transmission of a plurality of TBs.

The first communications device transmits, based on the first parameter, the plurality of TBs on transmission resources used for the transmission of the plurality of TBs.

In the eleventh aspect of this application, the composition modules of the communications device may further perform the steps described in the ninth aspect and the possible implementations. For details, refer to the description in the ninth aspect and the possible implementations.

According to a twelfth aspect, an embodiment of this application further provides a communications device. The communications device is specifically a second communications device, and the second communications device includes a processing module and a transceiver module.

The second communications device sends control information to a first communications device. The control information is used to schedule a plurality of transport blocks TBs.

The second communications device determines a first parameter, and uses or does not use, based on the first parameter, discontinuous transmission of a plurality of TBs; and the second communications device transmits, based on the first parameter, the plurality of TBs on transmission resources used for the transmission of the plurality of TBs.

In the twelfth aspect of this application, the modules constituting the communications device may further perform the steps described in the tenth aspect and the possible implementations. For details, refer to the description in the tenth aspect and the possible implementations.

In the fourth aspect of this application, the modules constituting the second communications device may further perform the steps described in the second aspect and the possible implementations. For details, refer to the description in the second aspect and the possible implementations.

According to a fifth aspect, an embodiment of this application provides a computer-readable storage medium. The computer-readable storage medium stores instructions, and when the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communications device. The communications device may include an entity, for example, a terminal device or a network device. The communications device includes a processor and a memory. The memory is configured to store instructions. The processor is configured to execute the instructions in the memory, to enable the communications device to perform the method according to the first aspect or the second aspect.

According to an eighth aspect, an embodiment of this application provides a chip system. The chip system includes a processor, and is configured to support a communications device implementing functions according to the foregoing aspects, for example, sending or processing data and/or information in the foregoing method. In a possible design, the chip system further includes a memory. The memory is configured to store program instructions and data that are necessary for the communications device. The chip system may include a chip, or may include a chip and another discrete component.

DESCRIPTION OF EMBODIMENTS

Figure 1:
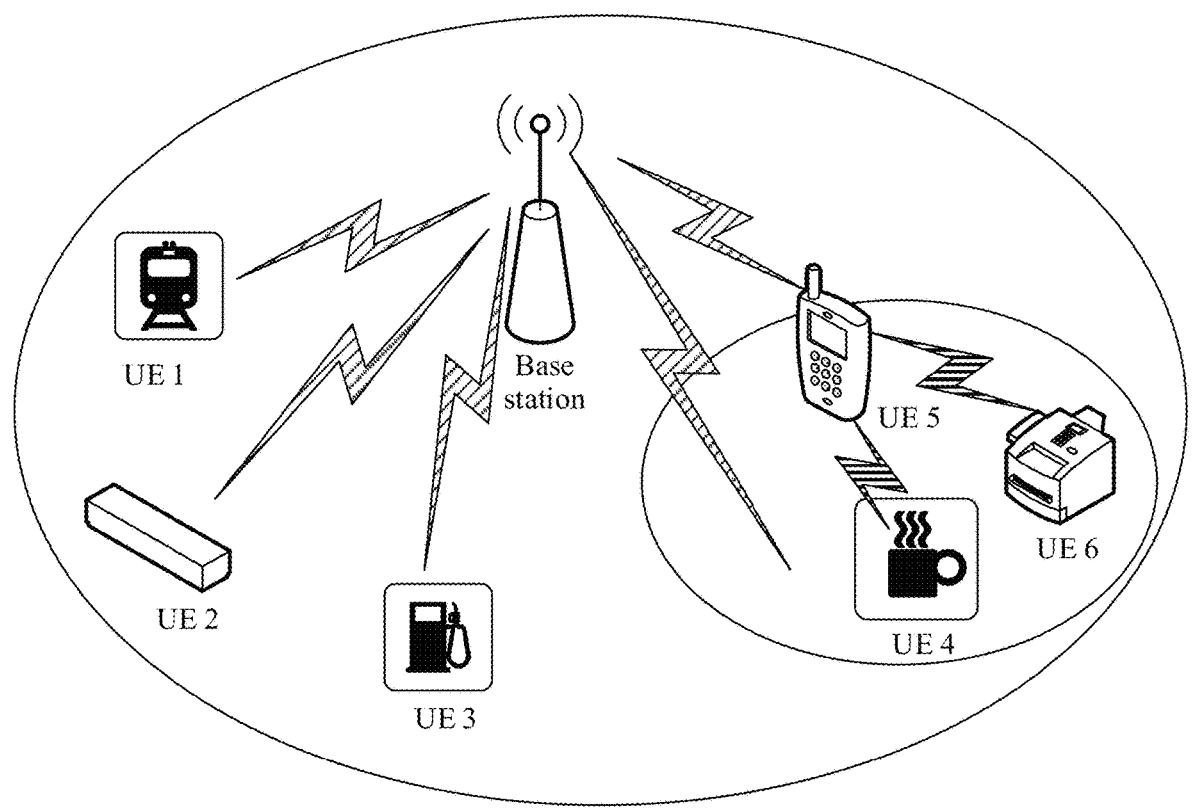
FIG. 1 is a schematic diagram of a system architecture of an information transmission method according to an embodiment of this application.

Embodiments of this application provide an information transmission method and a communications device, to align a start time unit of a transport block with a frequency hopping switching point, to combine repeated transmission in different time units, and improve data transmission performance.

The following describes the embodiments of this application with reference to the accompanying drawings.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, terms "include", "contain" and any other variants mean to cover the non-exclusive inclusion, so that a process, method, system, product, or device that includes a series of units is not limited to those units, but may include other units not expressly listed or inherent to such a process, method, system, product, or device.

The technical solutions in the embodiments of this application may be applied to various communications systems for data processing, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency division multiple access, OFDMA) system, a single-carrier frequency division multiple access (single-carrier FDMA, SC-FDMA) system, and another system. The terms "system" and "network" can be interchanged with each other. The CDMA system may implement wireless technologies such as universal terrestrial radio access (universal terrestrial radio access, UTRA) and CDMA2000. The UTRA may include a wideband CDMA (wideband CDMA, WCDMA) technology and another variation of CDMA. The CDMA2000 may cover the interim standard (interim standard, IS) 2000 (IS-2000), the IS-95 standard, and the IS-856 standard. The TDMA system may implement a wireless technology, for example, a global system for mobile communications (global system for mobile communications, GSM). The OFDMA system may implement wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA. The UTRA is corresponding to a UMTS, and the E-UTRA is corresponding to an evolved version of the UMTS. A new version of the UMTS that uses the E-UTRA is used in long term evolution (long term evolution, LTE) and various versions evolved based on LTE in 3GPP. A 5th generation (5th Generation, "5G" for short) communications system or new radio (New Radio, "NR" for short) is a next generation communications system under study. The technical solutions in the embodiments of this application may be applied to various communications systems such as V2X, LTE-V, V2V, internet of vehicles, MTC, IoT, LTE-M, M2M, and internet of things. In addition, the communications system is further applicable to a future-oriented communications technology, and is applicable to the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

The communications system provided in the embodiments of this application may include a first communications device and a second communications device, and data transmission may be performed between the first communications device and the second communications device. For example, the first communications device may include a terminal device, and the second communications device may include a network device. Alternatively, the first communications device may include one terminal device, and the second communications device may include another terminal device. Alternatively, the first communications device may include one network device, and the second communications device may include another network device.

FIG. 1 is a schematic diagram of a structure of a possible radio access network (radio access network, RAN) according to an embodiment of this application. The RAN may be a base station access system in a 2G network (to be specific, the RAN includes a base station and a base station controller), a base station access system in a 3G network (to be specific, the RAN includes a base station and an RNC), a base station access system in a 4G network (to be specific, the RAN includes an eNB and an RNC), or a base station access system in a 5G network.

The RAN includes one or more network devices. The network device may be any device having a wireless transceiver function, or a chip disposed in a device having a wireless transceiver function. The network device includes but is not limited to a base station (for example, a base station (BS), a NodeB, an evolved NodeB (eNodeB) or eNB, a gNodeB or gNB in a fifth generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. A core network may support a network using the foregoing one or more technologies, or a future evolved network. The base station may include one or more co-site or non-co-site transmission reception points (transmission reception point, TRP). The network device may alternatively be a radio controller, a centralized unit (centralized unit, CU), a distributed unit (distributed unit, DU), or the like in a cloud radio access network (cloud radio access network, CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting the 5G network, or may support a dual connection to a base station in an LTE network and a base station in the 5G network. For example, the terminals are connected to a RAN node of a wireless network. Currently, for example, the RAN node is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home NodeB (for example, a home evolved NodeB or home NodeB, HNB), a baseband unit (baseband unit, BBU), a wireless fidelity (wireless fidelity, Wi-Fi) access point (access point, AP), or the like. In a network structure, the network device may include a centralized unit (centralized unit, CU) node, a distributed unit (distributed unit, DU) node, or a RAN device including a CU node and a DU node.

The terminal devices 1 to 6 each are also referred to as user equipment (user equipment, UE), a mobile station (mobile station, MS), a mobile terminal (mobile terminal, MT), a terminal, or the like, and is a device that provides voice and/or data connectivity for a user, or is a chip disposed in the device, for example, a handheld device or a vehicle-mounted device having a wireless connection function. Currently, for example, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. The terminal device provided in the embodiments of this application may be a low-complexity terminal device and/or a terminal device in a coverage enhancement mode A.

In the embodiments of this application, the base station and UE 1 to UE 6 form a communications system. In the communications system, the base station sends one or more of system information, an RAR message, or a paging message to one or more of the UE 1 to the UE 6. In addition, the UE 4 to the UE 6 also form a communications system. In the communications system, the UE 5 may function as a base station, and the UE 5 may send one or more of system information, control information, or a paging message to one or more of the UE 4 and the UE 6.

In this application, transmission may be sending or receiving. When one side of the communication performs sending, a peer device of the communication performs receiving. A TB may be a TB for uplink transmission, or may be a TB for downlink transmission.

Figure 2:
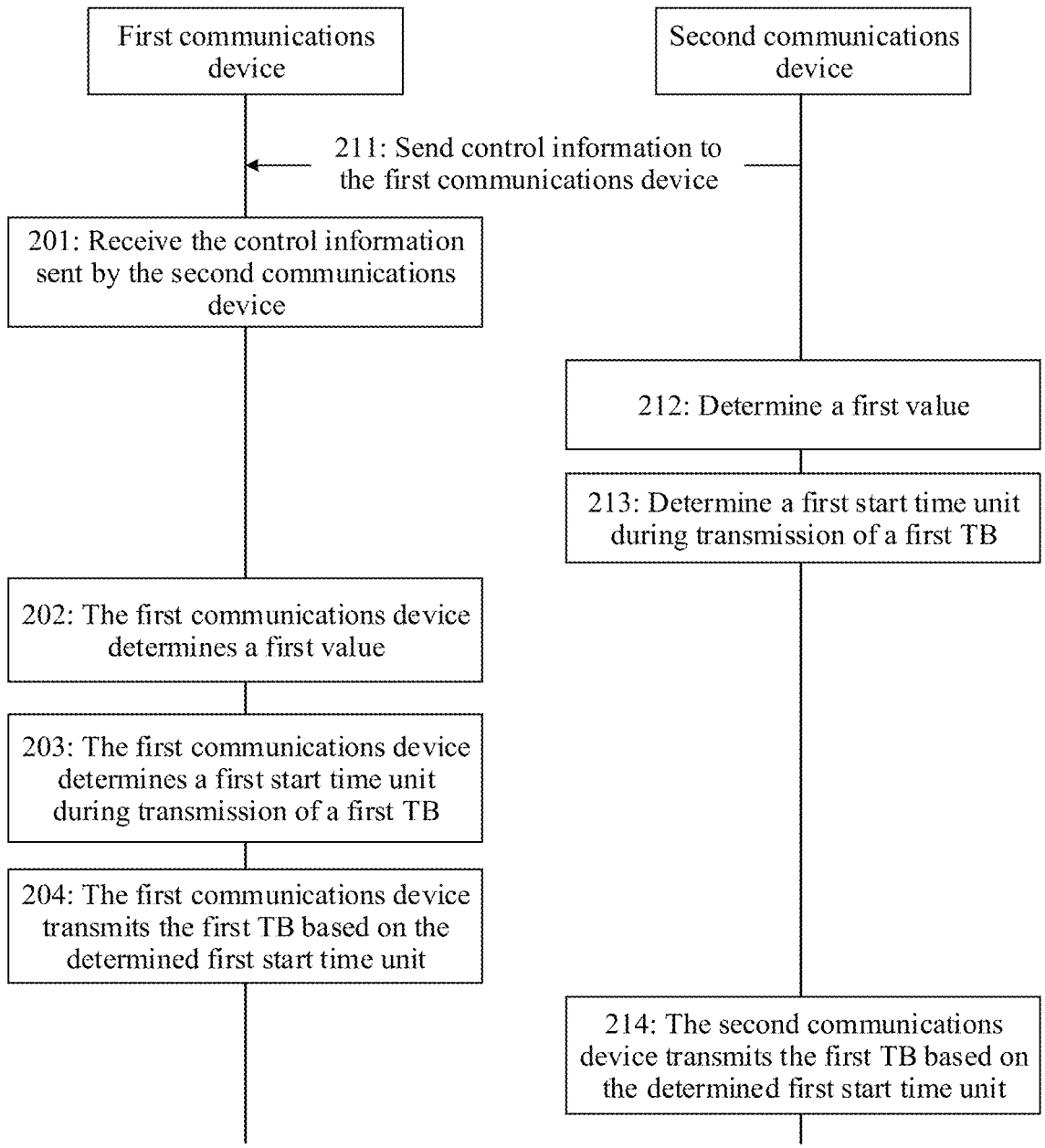
FIG. 2 is a schematic diagram of a procedure of interaction between a first communications device and a second communications device according to an embodiment of this application.

FIG. 2 is a schematic diagram of a procedure of interaction between a first communications device and a second communications device according to an embodiment of this application. For example, the first communications device may be the foregoing terminal device, and the second communications device may be the foregoing network device. An information transmission method provided in this embodiment of this application mainly includes the following steps.

211: The second communications device sends control information to the first communications device, where the control information is used to schedule a plurality of transport blocks TBs.

201: The first communications device receives the control information sent by the second communications device, where the control information is used to schedule the plurality of transport blocks TBs.

In this embodiment of this application, the second communications device first sends the control information to the first communications device. The control information may be downlink control information, and the control information may be used to schedule the plurality of TBs. A quantity of TBs scheduled by the control information is not limited herein, which may be specifically determined by the second communications device based on a network environment, an available transmission resource, a data delay requirement, and the like.

212: The second communications device determines a first value, where the first value is associated with one or more of a frequency hopping configuration parameter, a redundancy version RV change parameter, an interleaving gap parameter, and a quantity of transport blocks.

In this embodiment of this application, the second communications device determines the first value. The first value is a value associated with one or more of the frequency hopping configuration parameter, the redundancy version RV change parameter, the interleaving gap parameter, and the quantity of transport blocks. The first value may be used to determine a first start time unit corresponding to the first TB. To indicate the first start time unit, the first communications device needs to obtain the first value provided that the first value can indicate a value of the first start time unit. For example, the first value may be a frequency hopping gap indicated by the frequency hopping configuration parameter, an RV change gap configured by the RV change parameter, an interleaving gap between a plurality of TBs configured based on the interleaving gap parameter, or the quantity of transport blocks. For another example, the first value may be a value obtained by performing equivalent deformation or multiple expansion based on one or more of the frequency hopping configuration parameter, the redundancy version RV change parameter, the interleaving gap parameter, and the quantity of transport blocks. Specific content included in the first value and specific information indicated by the first value are not limited herein.

213: The second communications device determines the first start time unit during transmission of the first TB, where the first TB is at least one of the plurality of TBs scheduled by the control information, and an index of the first start time unit is an integer multiple of the first value.

In this embodiment of this application, the first TB is the at least one of the plurality of TBs scheduled by the control information. The second communications device determines the first start time unit, and the index of the first start time unit is an integer multiple of the first value. For example, the index of the first start time unit may be one time, two times, three times, or the like larger than the first value. A specific value of the index of the first start time unit is not limited. There are a plurality of implementations of a time unit. For example, the time unit may include one or more symbols, slots, subframes, and the like. A specific implementation of the time unit may be specifically determined based on an application scenario.

Figure 3:
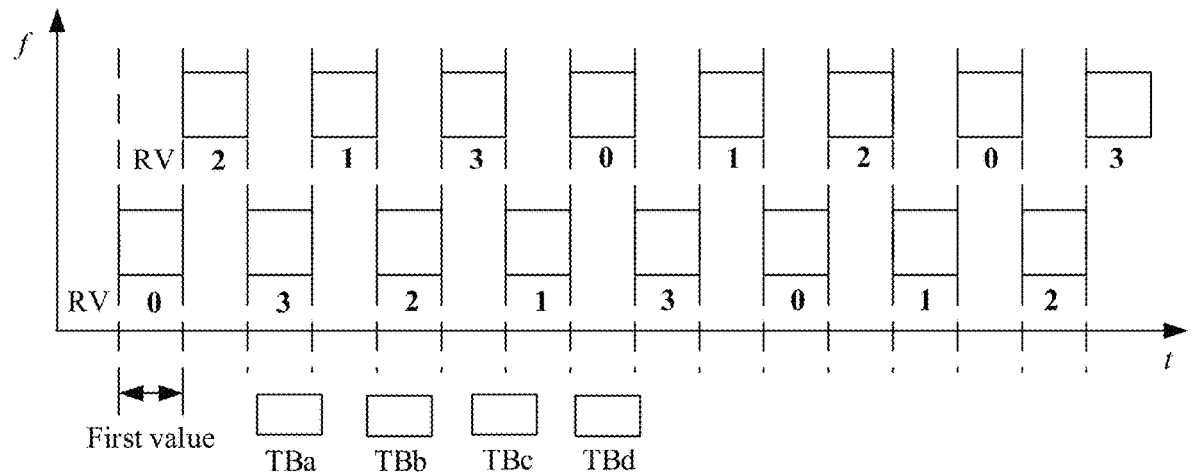
FIG. 3 is a schematic diagram of a configuration result of a start time unit according to an embodiment of this application.

For example, FIG. 3 is a schematic diagram of a configuration result of a start time unit according to an embodiment of this application. When the plurality of TBs are scheduled by the DCI, a start subframe S of transmission of the plurality of TBs meets S=N*M. M is a value of the first value, and N is a positive integer. For example, the first value is a frequency hopping-related parameter or is determined based on a frequency hopping-related parameter. Alternatively, the first value is an RV change-related parameter or is determined based on an RV change-related parameter. Alternatively, the first value is an interleaving-related parameter or is determined based on an interleaving-related parameter. For example, the value of the first value is equal to Ych, or the value of the first value is equal to Nacc. Ych is a frequency hopping gap or a frequency hopping parameter configured by a higher layer. Nacc is the redundancy version RV change parameter. Therefore, the start subframe S of the transmission of the plurality of TBs meets S=N*Ych or S=N*Nacc. Herein, N is an integer, and N may alternatively be 0. Alternatively, the start subframe S of the transmission of the plurality of TBs meets S=N*Ych*T, or S=N*Nacc*T. Herein, T is the quantity of TBs scheduled by the DCI.

For example, the DCI is used to schedule four TBs. A start subframe of transmission of a TB=N*the first value, where the first value is Ych. In this way, a same TB is transmitted in Ych consecutive subframes, so that data transmission can be combined, and transmission performance can be improved.

In some embodiments of this application, in step 213, that the second communications device transmits the first TB based on the determined first start time unit includes:

the second communications device determines, based on an end time unit of a control channel and a preset first delay, a second start time unit during the transmission of the first TB; and the second communications device transmits the first TB based on first indication information included in the control information, where the first indication information indicates that the first TB is transmitted in a first manner or a second manner.

The first manner includes: If the second start time unit is not an integer multiple of the first value, the transmission of the first TB is delayed to the first start time unit closest to the second start time unit, to transmit the first TB; and if the second start time unit is an integer multiple of the first value, the second start time unit is equal to the first start time unit, and the first TB is transmitted based on the first start time unit.

The second manner includes: The first TB is transmitted based on the second start time unit.

The first delay may be a preconfigured delay value. After the end time unit of the control channel is determined, a time unit is offset based on the end time unit and the preset first delay. In this case, an obtained time unit is the second time unit.

The control information sent by the second communications device may include the first indication information, and the first indication information is used to indicate a transmission manner used for the first TB. For example, when a value of the first indication information is 0, the first manner is used for the transmission, and when a value of the first indication information is 1, the second manner is used for the transmission.

For example, when the plurality of TBs are scheduled by one piece of the control information, and when the plurality of TBs are interleaved, time points at which the TBs change (or switch) may not be aligned with a frequency hopping switching point. Therefore, repeated transmission in different subframes cannot be combined, and data transmission performance is affected. To resolve a problem that repeatedly transmitted subframes cannot be combined because different subframes cannot be aligned, in this embodiment of this application, when the DCI is used to schedule a plurality of TBs, one piece of first information is indicated. The plurality of TBs are transmitted based on the first information. For example, the first information includes one bit. A bit status being 1 indicates that a start subframe of the transmission of the plurality of TBs is determined in the first manner. For example, the first manner is: A subframe S' of the transmission of the plurality of TBs is first determined based on an end subframe of the control channel and the first delay, and a subframe obtained after S' is delayed by X subframes is used as the start subframe S, so that the subframe S meets S=N*M. A bit status being 0 indicates that a start subframe of the transmission of the plurality of TBs is determined in the second manner. The second manner is: The start subframe of the transmission of the plurality of TBs is determined based on an end subframe of the control channel and the first delay. Definition of M is the same as above.

Figure 4:
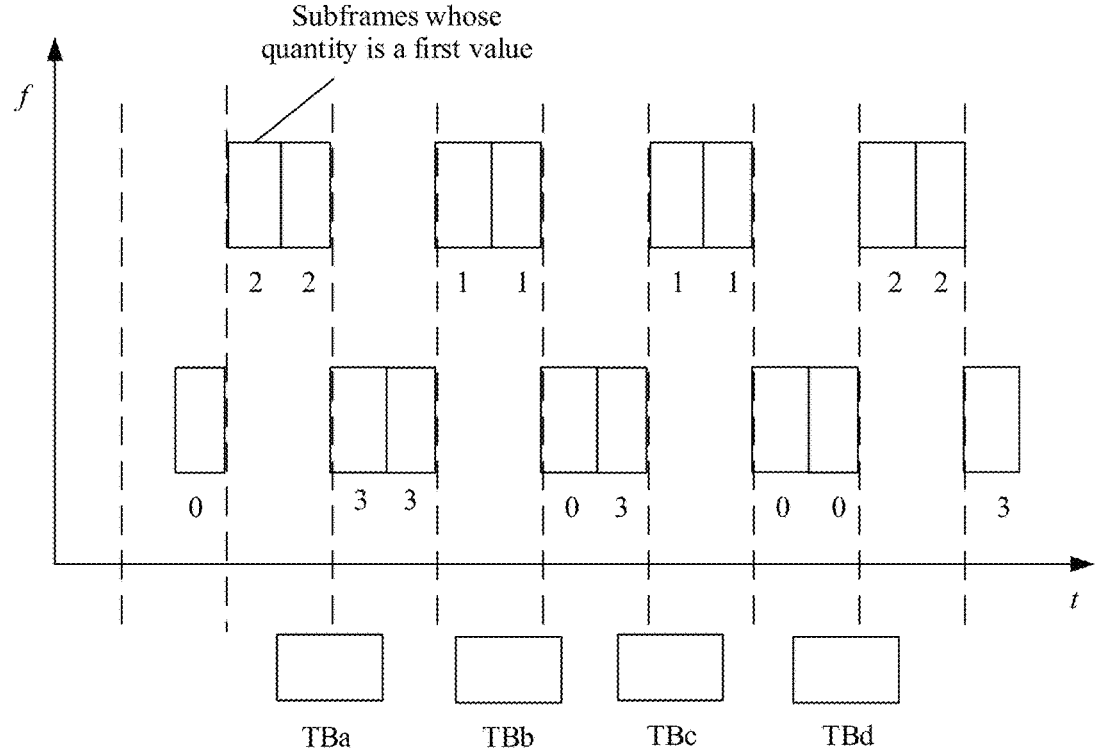
FIG. 4 is a schematic diagram of a configuration result of a start time unit according to an embodiment of this application.

FIG. 4 is a schematic diagram of a configuration result of a start time unit according to an embodiment of this application. M=Ych, and the start subframe S, determined in the second manner, of the transmission of the plurality of TBs does not meet S=N*Ych. Therefore, the transmission of the plurality of TBs may be delayed, so that the start subframe of the transmission of the plurality of TBs meets S=N*Ych.

Figure 5:
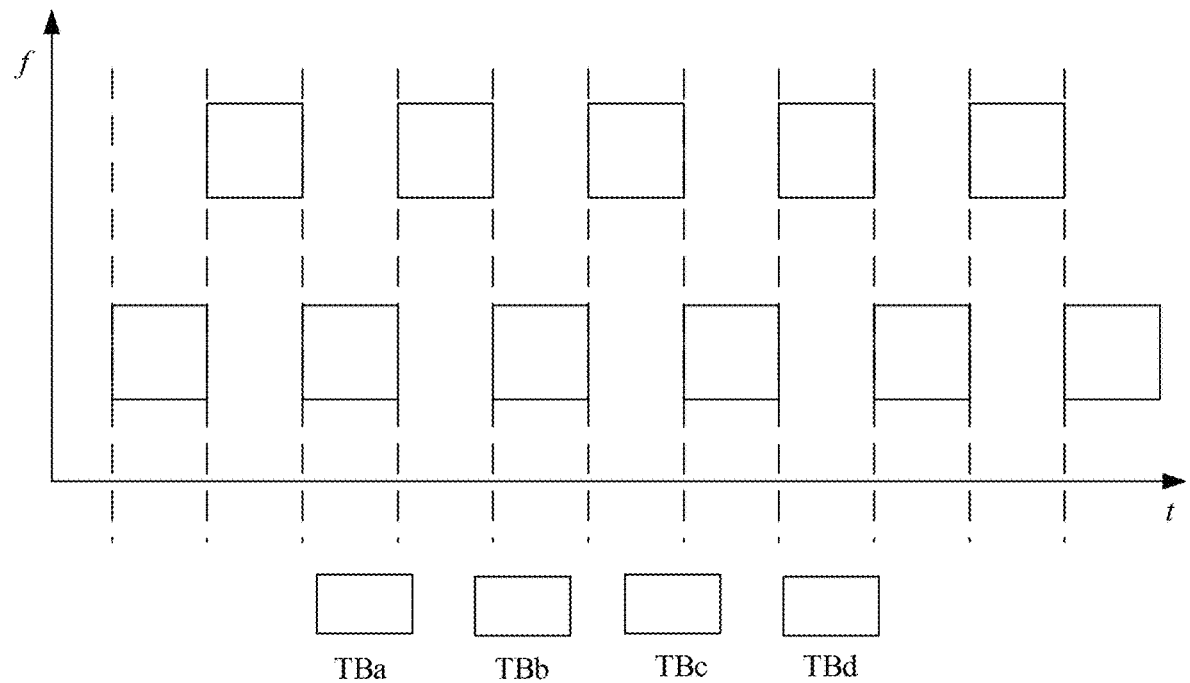
FIG. 5 is a schematic diagram of a configuration result of a start time unit according to an embodiment of this application.

FIG. 5 is a schematic diagram of a configuration result of a start time unit according to an embodiment of this application. For the delayed transmission of the plurality of TBs, frequency hopping is performed based on Ych. When the plurality of TBs are interleaved, time points at which the TBs change (or switch) are aligned with a frequency hopping switching point. In this way, transmission, in different subframes, of a same TB is distributed on a same frequency band. Therefore, repeated transmission in different subframes can be combined, and data transmission performance is improved.

In some embodiments of this application, the method provided in this embodiment of this application further includes:

the second communications device determines, based on an end time unit of a control channel and a preset first delay, a second start time unit during the transmission of the first TB, where if the second start time unit is not an integer multiple of the first value, the transmission of the first TB is delayed to the first start time unit closest to the second start time unit, to transmit the first TB.

When the start subframe of the transmission of the plurality of TBs is not a multiple of the frequency hopping configuration parameter Ych or the RV change parameter Nacc, the transmission of the plurality of TBs is delayed to a nearest subframe, where the subframe is a multiple of M, and M is the first value. Time points at which the TBs change (or switch) are aligned with a frequency hopping switching point. In this way, transmission, in different subframes, of a same TB is distributed on a same frequency band. Therefore, repeated transmission in different subframes can be combined, and data transmission performance is improved.

202: The first communications device determines a first value, where the first value is associated with one or more of a frequency hopping configuration parameter, a redundancy version RV change parameter, an interleaving gap parameter, and a quantity of transport blocks.

In this embodiment of this application, the first communications device determines the first value. The first value is a value associated with one or more of the frequency hopping configuration parameter, the redundancy version RV change parameter, the interleaving gap parameter, and the quantity of transport blocks. The first value may be used to determine a first start time unit corresponding to a first TB. To indicate the first start time unit, the first communications device needs to obtain the first value provided that the first value can indicate a value of the first start time unit. For example, the first value may be a frequency hopping gap indicated by the frequency hopping configuration parameter, an RV change gap configured by the RV change parameter, an interleaving gap between a plurality of TBs configured based on the interleaving gap parameter, or the quantity of transport blocks. For example, the first value may be a product of the frequency hopping gap and the quantity of transport blocks, or the first value may be a product of the RV change gap and the quantity of transport blocks. For another example, the first value may be a value obtained by performing equivalent deformation or multiple expansion based on one or more of the frequency hopping configuration parameter, the redundancy version RV change parameter, the interleaving gap parameter, and the quantity of transport blocks. Specific content included in the first value and specific information indicated by the first value are not limited herein.

203: The first communications device determines the first start time unit during transmission of the first TB, where the first TB is at least one of the plurality of TBs scheduled by the control information, and an index of the first start time unit is an integer multiple of the first value.

In this embodiment of this application, the first TB is the at least one of the plurality of TBs scheduled by the control information. The first communications device determines the first start time unit, and the index of the first start time unit is an integer multiple of the first value. For example, the index of the first start time unit may be one time, two times, three times, or the like larger than the first value. A specific value of the index of the first start time unit is not limited. There are a plurality of implementations of a time unit. For example, the time unit may include one or more symbols, slots, subframes, and the like. A specific implementation of the time unit may be specifically determined based on an application scenario.

In some embodiments of this application, in step 203, that the first communications device transmits the first TB based on the determined first start time unit includes:

the first communications device determines, based on an end time unit of a control channel and a preset first delay, a second start time unit during the transmission of the first TB; and the first communications device transmits the first TB based on first indication information included in the control information, where the first indication information indicates that the first TB is transmitted in a first manner or a second manner.

The first manner includes: If the second start time unit is not an integer multiple of the first value, the transmission of the first TB is delayed to the first start time unit closest to the second start time unit, to transmit the first TB; and if the second start time unit is an integer multiple of the first value, the second start time unit is equal to the first start time unit, and the first TB is transmitted based on the first start time unit.

The second manner includes: The first TB is transmitted based on the second start time unit.

The first delay may be a preconfigured delay value. After the end time unit of the control channel is determined, a time unit is offset based on the end time unit and the preset first delay. In this case, an obtained time unit is the second time unit.

The control information sent by the second communications device may include the first indication information, and the first indication information is used to indicate a transmission manner used for the first TB. For example, when a value of the first indication information is 0, the first manner is used for the transmission, and when a value of the first indication information is 1, the second manner is used for the transmission.

In some embodiments of this application, the method provided in this embodiment of this application may further include:

the first communications device determines, based on an end time unit of a control channel and a preset first delay, a second start time unit during the transmission of the first TB, where if the second start time unit is not an integer multiple of the first value, the transmission of the first TB is delayed to the first start time unit closest to the second start time unit, to transmit the first TB.

When the start subframe of the transmission of the plurality of TBs is not a multiple of the frequency hopping configuration parameter Ych or the RV change parameter Nacc, the transmission of the plurality of TBs is delayed to a nearest subframe, where the subframe is a multiple of M, and M is the first value. Time points at which the TBs change (or switch) are aligned with a frequency hopping switching point. In this way, transmission, in different subframes, of a same TB is distributed on a same frequency band. Therefore, repeated transmission in different subframes can be combined, and data transmission performance is improved.

204: The first communications device transmits the first TB based on the determined first start time unit.

214: The second communications device transmits the first TB based on the determined first start time unit.

In this embodiment of this application, after the first communications device and the second communications device separately determine the first start time unit, for example, the first communications device transmits the first TB based on the determined first start time unit, and for another example, the second communications device transmits the first TB based on the determined first start time unit. The transmission herein includes: The first communications device sends data or information to the second communications device, and the second communications device sends data or information to the first communications device.

It can be learned from the examples and description of this application in the foregoing embodiments that the first communications device receives the control information sent by the second communications device. The control information is used to schedule the plurality of transport blocks TBs. The first communications device determines the first value. The first value is associated with one or more of the frequency hopping configuration parameter, the redundancy version RV change parameter, the interleaving gap parameter, and the quantity of transport blocks. For example, the first value may be a product of the frequency hopping gap and the quantity of transport blocks, or the first value may be a product of the RV change gap and the quantity of transport blocks. The first communications device determines the first start time unit during the transmission of the first TB. The first TB is the at least one of the plurality of TBs scheduled by the control information, and the index of the first start time unit is an integer multiple of the first value. The first communications device transmits the first TB based on the determined first start time unit. In this embodiment of this application, the index, of the first start time unit, corresponding to the first TB is an integer multiple of a first parameter. Therefore, a time point at which the TB changes (or switches) is aligned with a frequency hopping switching point. In this way, transmission, in different subframes, of a same TB is distributed on a same frequency band. Therefore, repeated transmission in different subframes can be combined, and data transmission performance is improved.

To resolve a problem that when a quantity of scheduled TBs is a multiple of a quantity of narrowbands performing frequency hopping, transmission of the TBs does not perform frequency hopping. The following solution in an embodiment of this application is applicable to a low-latency data transmission scenario. An embodiment of this application provides an information transmission method, including:

a first communications device receives control information sent by a second communications device, where the control information is used to schedule the plurality of transport blocks TBs;

when the control information enables frequency hopping, the first communications device determines a narrowband for transmitting a first TB in each time unit used during transmission of the first TB, where the first TB is at least one of the plurality of TBs scheduled by the control information;

if a quantity of narrowbands performing frequency hopping is an even quantity and an odd quantity of TBs are scheduled by the control information, the first communications device determines, according to a first frequency hopping rule, the narrowband for transmitting the first TB in each time unit used during the transmission of the first TB; and if a quantity of narrowbands performing frequency hopping is an even quantity and an even quantity of TBs are scheduled by the control information, the first communications device determines, according to a second frequency hopping rule, the narrowband for transmitting the first TB in each time unit used during the transmission of the first TB.

The first frequency hopping rule is: A narrowband index is determined according to a function $F1(x)$.

The second frequency hopping rule is: A narrowband index is determined according to a function $F2(x, y)$.

x is one or more parameters used in the function, and the parameter includes a variable and/or a constant.

y is a predefined constant, or y is a constant determined based on at least one of the quantity of narrowbands performing frequency hopping and the quantity of TBs scheduled by the control information.

An embodiment of this application provides an information transmission method, including:

a second communications device sends control information to a first communications device, where the control information is used to schedule a plurality of transport blocks TBs;

when the control information enables frequency hopping, the second communications device determines a narrowband for transmitting a first TB in each time unit used during transmission of the first TB, where the first TB is at least one of the plurality of TBs scheduled by the control information;

if a quantity of narrowbands performing frequency hopping is an even quantity and an odd quantity of TBs are scheduled by the control information, the second communications device determines, according to a first frequency hopping rule, the narrowband for transmitting the first TB in each time unit used during the transmission of the first TB; and if a quantity of narrowbands performing frequency hopping is an even quantity and an even quantity of TBs are scheduled by the control information, the second communications device determines, according to a second frequency hopping rule, the narrowband for transmitting the first TB in each time unit used during the transmission of the first TB.

The first frequency hopping rule is: A narrowband index is determined according to a function $F1(x)$.

The second frequency hopping rule is: A narrowband index is determined according to a function $F2(x, y)$.

x is one or more parameters used in the function, and the parameter includes a variable and/or a constant.

y is a predefined constant, or y is a constant determined based on at least one of the quantity of narrowbands performing frequency hopping and the quantity of TBs scheduled by the control information.

Figure 6:
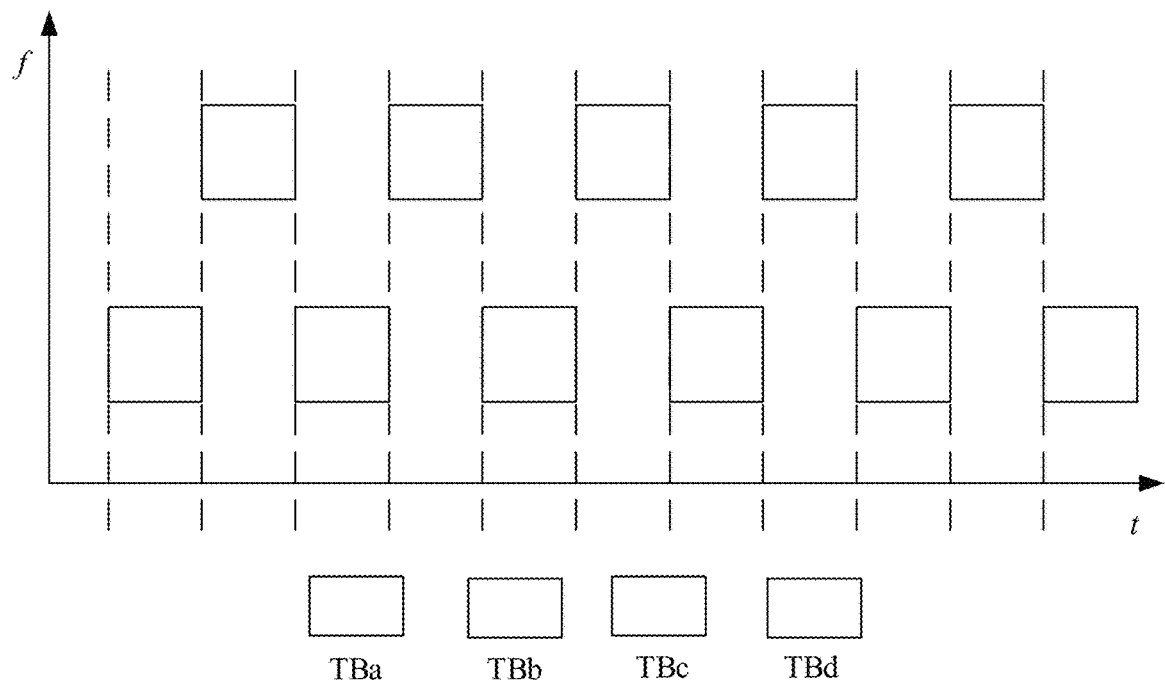
FIG. 6 is a schematic diagram in which a frequency on which a TB is located is a fixed narrowband.

FIG. 6 is a schematic diagram in which a frequency on which a TB is located is a fixed narrowband. When four TBs are interleaved and frequency hopping is enabled (enable), a TBx is transmitted over only one frequency band. If a quantity of narrowbands performing frequency hopping is an even quantity and an odd quantity of TBs are scheduled by the control information, the second communications device determines, according to the first frequency hopping rule, the narrowband for transmitting the first TB in each time unit used during the transmission of the first TB. If a quantity of narrowbands performing frequency hopping is an even quantity and an even quantity of TBs are scheduled by the control information, the second communications device determines, according to the second frequency hopping rule, the narrowband for transmitting the first TB in each time unit used during the transmission of the first TB. Through the foregoing configuration, the narrowband for transmitting the first TB may not always be fixed on one frequency. This implements frequency hopping to different frequencies when the plurality of TBs are scheduled by the control information.

In some embodiments of this application, the first frequency hopping rule is:

$$n_{NB}^{(i)} = \left(n_{NB}^{(i_0)} + \left(\left\lfloor \frac{i+i_\Delta}{N_{NB}^{ch}} \right\rfloor - j_0 \bmod N_{NB,hop}^{ch}\right) \cdot f_{NE,hop}\right) \bmod N_{NB}$$

$$j_0 = \lfloor (i_0 + i_\Delta)/N_{NB}^{ch} \rfloor$$

$$i_0 \le i \le i_0 + N_{abs}^{PxSCH} - 1$$

$$i_\Delta = \begin{cases} 0, & \text{Frame structure type 1} \\ N_{NB}^{ch} - 2, & \text{Frame structure type 2} \end{cases}.$$

The second frequency hopping rule is:

$$n_{NB}^{(i)} = \left(n_{NB}^{(i_0)} + \left(\left\lfloor \frac{i+i_\Delta}{N_{NB}^{ch}} \right\rfloor - j_0 \bmod N_{NB,hop}^{ch}\right) \cdot f_{NB,hop}\right) +$$

-continued $$\left(\left(\left\lfloor \frac{i+i_\Delta}{N_{NB}^{ch}} \right\rfloor - j_0 \right\rfloor/y\right) \bmod N_{NB,hop}^{ch}\right) \cdot f_{NB,hop}\right) \bmod N_{NB}$$

$$j_0 = \lfloor (i_0 + i_\Delta)/N_{NB}^{ch} \rfloor$$

$$i_0 \le i \le i_0 + N_{abs}^{PxSCH} - 1$$

$$i_\Delta = \begin{cases} 0, & \text{Frame structure type 1} \\ N_{NB}^{ch} - 2, & \text{Frame structure type 2} \end{cases}.$$

Alternatively,
the first frequency hopping rule is:

$$n_{NB}^{(i)} = \begin{cases} n_{NB}^{(i_0)} & \text{if } \lfloor i/N_{NB}^{ch} - j_0 \rfloor \bmod 2 = 0 \\ (n_{NB}^{(i_0)} + f_{NB,hop}) \bmod N_{NB} & \text{if } \lfloor i/N_{NB}^{ch} - j_0 \rfloor \bmod 2 = 1 \end{cases}$$

$$j_0 = \lfloor i_0/N_{NB}^{ch} \rfloor$$

$$i_0 \le i \le i_0 + N_{abs}^{PxSCH} - 1.$$

The second frequency hopping rule is:

$$n_{NB}^{(i)} =$$

$$\begin{cases} \left(n_{NB}^{(i_0)} + \left(\left\lfloor \frac{i}{N_{NB}^{ch}} \right\rfloor - j_0 \right\rfloor/y\right) \bmod 2\right) \cdot f_{NB,hop}\right) \bmod N_{NB} & \text{if } \lfloor i/N_{NB}^{ch} - j_0 \rfloor \bmod 2 = 0 \\ \left(n_{NB}^{(i_0)} + f_{NB,hop} + \left(\left\lfloor \frac{i}{N_{NB}^{ch}} \right\rfloor - j_0 \right\rfloor/y\right) \bmod 2\right) \cdot f_{NB,hop}\right) \bmod N_{NB} & \text{if } \lfloor i/N_{NB}^{ch} - j_0 \rfloor \bmod 2 = 1 \end{cases}$$

$$j_0 = \lfloor i_0/N_{NB}^{ch} \rfloor$$

$$i_0 \le i \le i_0 + N_{abs}^{PxSCH} - 1.$$

$n_{NB}^{(i)}$ is a narrowband index used when the first TB is transmitted in a time unit i.

$n_{NB}^{(i_0)}$ is a narrowband index used when the first TB is transmitted in a time unit $i_0$.

$N_{NB}^{ch}$ is a quantity of consecutive absolute time units, and during frequency hopping to another narrowband, the first TB is transmitted over a same narrowband in the $N_{NB}^{ch}$ consecutive absolute time units.

$N_{NB,hop}^{ch}$ is a quantity of narrowbands performing frequency hopping.

$f_{NB,hop}$ is a narrowband offset for frequency hopping between one narrowband and another narrowband.

$N_{NB}$ is a quantity of narrowbands in bandwidth.

$N_{abs}^{PxSCH}$ is a quantity of time units associated with the first TB transmitted over a PxSCH, and the PxSCH may be a physical uplink shared channel or a physical downlink shared channel.

mod is a modulo operation.

Figure 7:
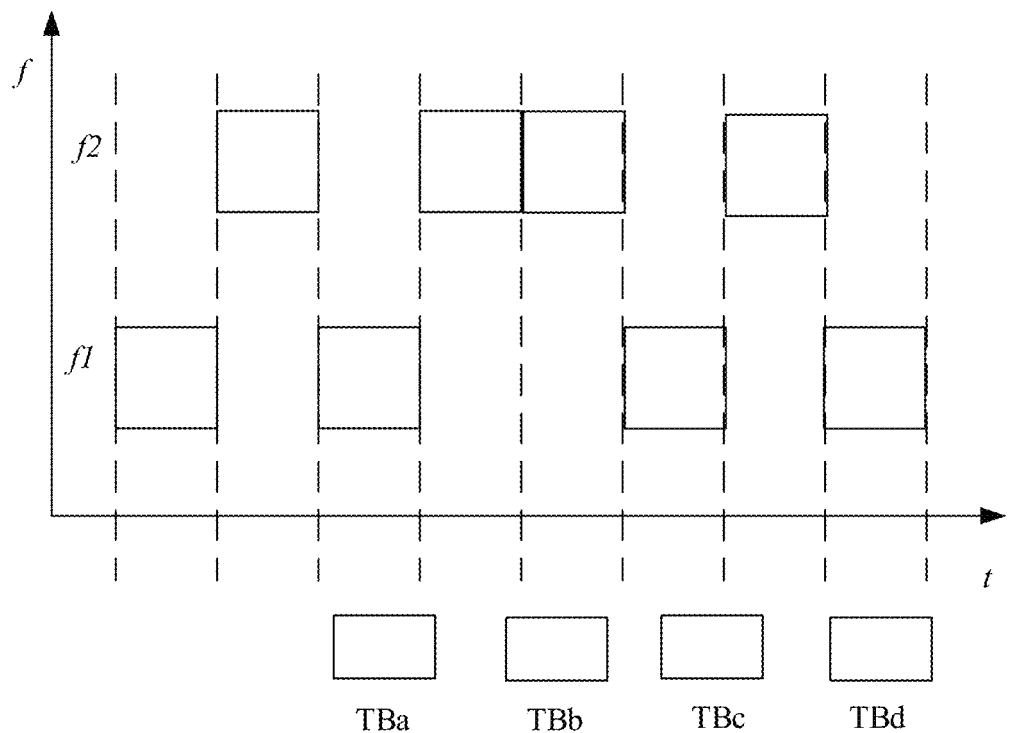
FIG. 7 is a schematic diagram in which a frequency on which a TB is located is a non-fixed narrowband according to an embodiment of this application.

FIG. 7 is a schematic diagram in which a frequency on which a TB is located is a non-fixed narrowband according to an embodiment of this application. To obtain a frequency hopping gain during transmission of a TB, a frequency band for the transmission may be changed, so that the transmission of the TBx may hop on a plurality of frequency bands.

For example, a second parameter y is introduced, and a frequency hopping resource is determined based on the second parameter. The second parameter may be determined based on a quantity of TBs scheduled by DCI and/or an interleaving gap of the TBs. Alternatively, the second parameter is preset, or is configured by a base station. The following formula shows a method for determining frequency hopping based on the second parameter y. It should be noted that the formula may be changed or a frequency hopping pattern may be identified in another manner. A frequency hopping pattern described in the following formula is within the protection scope of this embodiment of this application provided that the frequency hopping pattern meets the following formula.

For example, the following relationship exists:

$$n_{NB}^{(i)} = \left( n_{NB}^{(i_0)} + \left( \left\lfloor \frac{i+i_\Delta}{N_{NB}^{ch,DL}} - j_0 \right\rfloor \bmod N_{NB,hop}^{ch,DL} \right) \cdot f_{NB,hop}^{DL} \right) +$$

$$\left( \left( \left\lfloor \frac{i+i_\Delta}{N_{NB}^{ch,DL}} - j_0 \right\rfloor \Big/ y \right) \bmod N_{NB,hop}^{ch,DL} \right) \bmod N_{NB}^{DL}$$

$$j_0 = \lfloor (i_0 + i_\Delta) / N_{NB}^{ch,DL} \rfloor$$

$$i_0 \le i \le i_0 + N_{abs}^{PDSCH} - 1$$

$$i_\Delta = \begin{cases} 0, & \text{Frame structure type 1} \\ N_{NB}^{ch,DL} - 2, & \text{Frame structure type 2} \end{cases}.$$

It is assumed that y=4, and a plurality of TBs are interleaved based on a frequency hopping granularity Ych. A frequency of transmission of the plurality of TBs is changed as shown in the following figure.

For another example, it is assumed that the interleaving gap of the TBs is equal to T, and the quantity of TBs scheduled by the DCI is H. The second parameter may be equal to L*T*H, where L is an odd number. It is assumed that frequency hopping is performed for the transmission of the plurality of TBs on two frequency resources f1 and f2. According to an existing frequency hopping formula, from a start subframe of transmission of a TB, the TB is transmitted on fi in an L*T*H subframe. In the L*T*H subframe, the TB is transmitted on fj, where i is not equal to j, and i and j are positive integers whose values are 1 or 2.

To resolve a problem that a TB transmission delay increases when the DCI is used to schedule the plurality of TBs being interleaved together, the following solution in an embodiment of this application is applicable to a low-latency data transmission scenario. An embodiment of this application provides an information transmission method, including:

a first communications device receives control information sent by a second communications device, where the control information is used to schedule a plurality of transport blocks TBs;

the first communications device determines a second parameter, where the second parameter indicates a quantity of TBs that are co-interleaved; and the first communications device transmits, based on the second parameter, the plurality of TBs on transmission resources used for the transmission of the plurality of TBs.

To reduce a TB transmission delay, a base station may configure the quantity of TBs being interleaved together. For example, the quantity of TBs that can be interleaved together is determined based on a fourth parameter.

Figure 8:
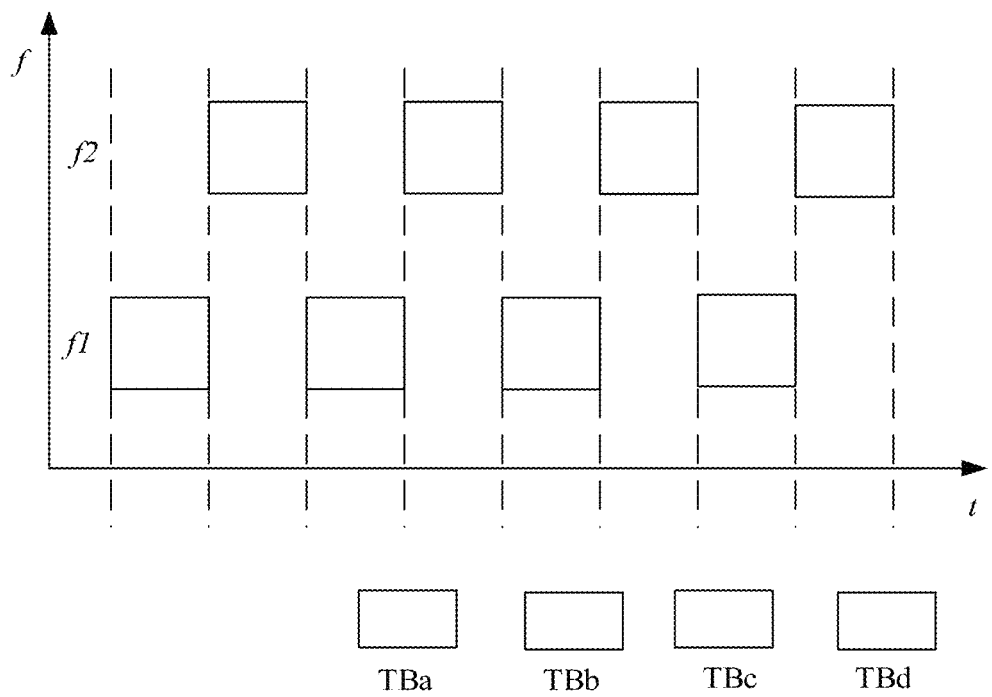
FIG. 8 is a schematic diagram of TBs being interleaved on a narrowband according to an embodiment of this application.

FIG. 8 is a schematic diagram of TBs being interleaved on a narrowband according to an embodiment of this application. It is assumed that DCI is used to schedule four TBs: a TBa, a TBb, a TBc, and a TBd. However, the base station configures the fourth parameter, and the fourth parameter indicates the quantity of TBs being interleaved together. If the fourth parameter=2, two TBs may be interleaved together. Therefore, the TBa and the TBb may be interleaved together, and the TBc and the TBd may be interleaved together.

To resolve a problem that the transmission of the plurality of TBs may be discontinuous when the plurality of TBs are transmitted or interleaved, when there is a time gap (Gap) in transmission of a TB according to this embodiment of this application, a transmission solution for the plurality of TBs is provided based on the gap. An embodiment of this application provides an information transmission method, including:

a first communications device receives control information sent by a second communications device, where the control information is used to schedule the plurality of transport blocks TBs; and the first communications device determines a first parameter, and uses or does not use, based on the first parameter, discontinuous transmission of a plurality of TBs. For example, the first parameter indicates that discontinuous transmission of the plurality of TBs is enabled or disabled.

The first communications device transmits, based on the first parameter, the plurality of TBs on transmission resources used for the transmission of the plurality of TBs.

An embodiment of this application provides an information transmission method, including:

a second communications device sends control information to a first communications device, where the control information is used to schedule a plurality of transport blocks TBs; and the second communications device determines a first parameter, and uses or does not use, based on the first parameter, discontinuous transmission of a plurality of TBs. For example, the first parameter indicates that discontinuous transmission of the plurality of TBs is enabled or disabled.

The second communications device transmits, based on the first parameter, the plurality of TBs on transmission resources used for the transmission of the plurality of TBs.

In some embodiments of this application, when the first parameter indicates that discontinuous transmission of the plurality of TBs is used, any one of the plurality of TBs is not transmitted from a first time unit to a second time unit, an index of the first time unit is an integer multiple of a second value, and/or a quantity of time units included in the first time unit to the second time unit is an integer multiple of the second value.

The second value is associated with one or more of a frequency hopping configuration parameter, a redundancy version RV change parameter, an interleaving gap parameter, and a quantity of transport blocks. For example, the second value may be a product of a frequency hopping gap and the quantity of transport blocks, or the second value may be a product of an RV change gap and the quantity of transport blocks.

Figure 9:
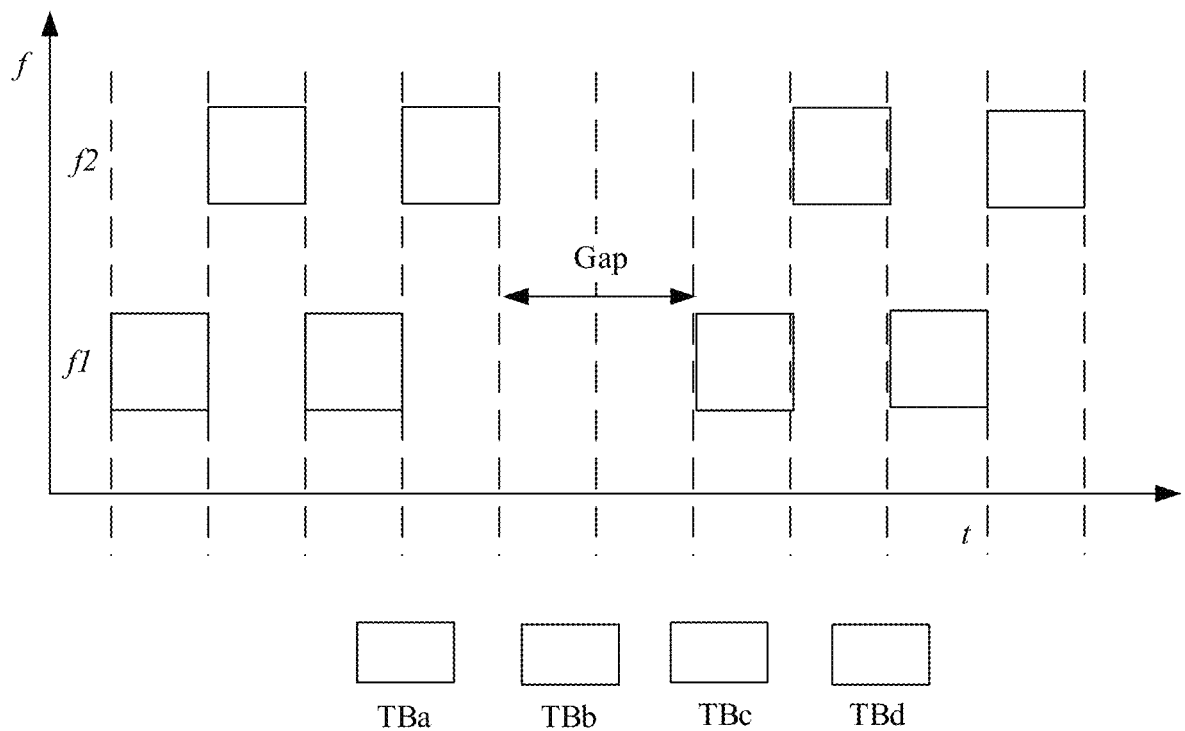
FIG. 9 is a schematic diagram of a gap between TBs according to an embodiment of this application.

FIG. 9 is a schematic diagram of a gap between TBs according to an embodiment of this application. There may be a gap in transmission of TBs. To facilitate frequency hopping and interleaving of the TBs, a length of the gap may be a multiple of M. Definition of M is as the foregoing first value. In addition, a start subframe of the gap is also a multiple of M. A base station may configure one or more of the length and the start subframe of the gap. The base station may enable or disable gap-based transmission of a plurality of TBs. For example, there is the gap in the transmission of the TBs, and the length of the gap is a multiple of Ych.

The solutions in the embodiments of this application can reduce overheads of control information, ensure indication flexibility, and improve a data transmission success rate. The frequency hopping and RV update methods determined in the embodiments of this application can improve a time diversity gain and a frequency diversity gain, and improve a data transmission success rate.

It should be noted that for ease of brief description, the foregoing method embodiments are represented as a series of actions. However, a person skilled in the art should appreciate that this application is not limited to the described order of the actions, because according to this application, some steps may be performed in other orders or simultaneously. In addition, a person skilled in the art should also appreciate that the embodiments described in this specification are all preferred embodiments, and the actions and modules are not necessarily mandatory in this application.

To better implement the foregoing solutions in the embodiments of this application, the following further provides a related apparatus for implementing the foregoing solutions.

Figure 10:
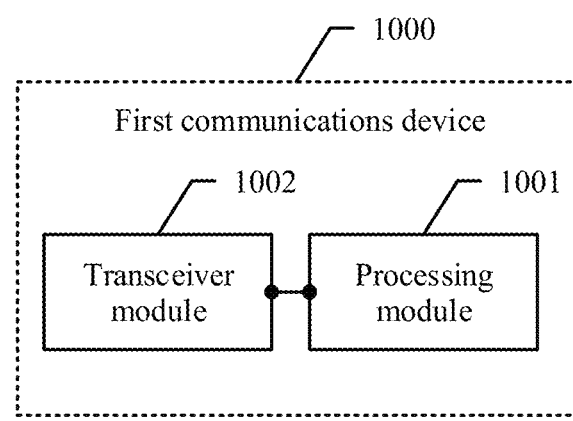
FIG. 10 is a schematic diagram of a composition structure of a first communications device according to an embodiment of this application.

FIG. 10 is a schematic diagram of a composition structure of a first communications device according to an embodiment of this application. The first communications device 1000 includes a processing module 1001 and a transceiver module 1002.

The transceiver module is configured to receive control information sent by a second communications device. The control information is used to schedule a plurality of transport blocks TBs.

The processing module is configured to determine a first value. The first value is associated with one or more of a frequency hopping configuration parameter, a redundancy version RV change parameter, an interleaving gap parameter, and a quantity of transport blocks.

The processing module is configured to determine a first start time unit during transmission of a first TB. The first TB is at least one of the plurality of TBs scheduled by the control information, and an index of the first start time unit is an integer multiple of the first value.

The processing module is configured to transmit, by using the transceiver module, the first TB based on the determined first start time unit.

In some embodiments of this application, the processing module is configured to: determine, based on an end time unit of a control channel and a preset first delay, a second start time unit during the transmission of the first TB; and transmit the first TB based on first indication information included in the control information. The first indication information indicates that the first TB is transmitted in a first manner or a second manner.

The first manner includes: If the second start time unit is not an integer multiple of the first value, the transmission of the first TB is delayed to the first start time unit closest to the second start time unit, to transmit the first TB; and if the second start time unit is an integer multiple of the first value, the second start time unit is equal to the first start time unit, and the first TB is transmitted based on the first start time unit.

The second manner includes: The first TB is transmitted based on the second start time unit.

In some embodiments of this application, the processing module is configured to determine, based on an end time unit of a control channel and a preset first delay, a second start time unit during the transmission of the first TB. If the second start time unit is not an integer multiple of the first value, the transmission of the first TB is delayed to the first start time unit closest to the second start time unit, to transmit the first TB.

Figure 11:
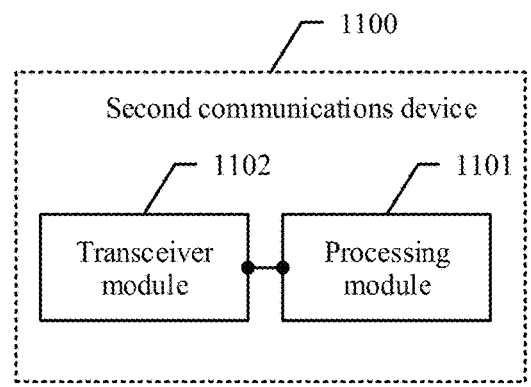
FIG. 11 is a schematic diagram of a composition structure of a second communications device according to an embodiment of this application.

FIG. 11 is a schematic diagram of a composition structure of a second communications device according to an embodiment of this application. The second communications device 1100 includes a processing module 1101 and a transceiver module 1102.

The transceiver module 1102 is configured to send control information to a first communications device. The control information is used to schedule a plurality of transport blocks TBs.

The processing module 1101 is configured to determine a first value. The first value is associated with one or more of a frequency hopping configuration parameter, a redundancy version RV change parameter, an interleaving gap parameter, and a quantity of transport blocks.

The processing module 1101 is configured to determine a first start time unit during transmission of a first TB. The first TB is at least one of the plurality of TBs scheduled by the control information, and an index of the first start time unit is an integer multiple of the first value.

The processing module 1101 is configured to transmit the first TB based on the determined first start time unit.

In some embodiments of this application, the processing module is configured to: determine, based on an end time unit of a control channel and a preset first delay, a second start time unit during the transmission of the first TB; and transmit the first TB based on first indication information included in the control information. The first indication information indicates that the first TB is transmitted in a first manner or a second manner.

The first manner includes: If the second start time unit is not an integer multiple of the first value, the transmission of the first TB is delayed to the first start time unit closest to the second start time unit, to transmit the first TB; and if the second start time unit is an integer multiple of the first value, the second start time unit is equal to the first start time unit, and the first TB is transmitted based on the first start time unit.

The second manner includes: The first TB is transmitted based on the second start time unit.

In some embodiments of this application, the processing module is configured to determine, based on an end time unit of a control channel and a preset first delay, a second start time unit during the transmission of the first TB. If the second start time unit is not an integer multiple of the first value, the transmission of the first TB is delayed to the first start time unit closest to the second start time unit, to transmit the first TB.

An embodiment of this application further provides a communications device. The communications device is specifically a first communications device, and the first communications device includes a processing module and a transceiver module.

The transceiver module is configured to receive control information sent by a second communications device. The control information is used to schedule a plurality of transport blocks TBs.

The processing module is configured to: when the control information enables frequency hopping, determine a narrowband for transmitting a first TB in each time unit used during transmission of the first TB. The first TB is at least one of the plurality of TBs scheduled by the control information.

The processing module is configured to: if a quantity of narrowbands performing frequency hopping is an even quantity and an odd quantity of TBs are scheduled by the control information, determine, according to a first frequency hopping rule, the narrowband for transmitting the first TB in each time unit used during the transmission of the first TB.

The processing module is configured to: if a quantity of narrowbands performing frequency hopping is an even quantity and an even quantity of TBs are scheduled by the control information, determine, according to a second frequency hopping rule, the narrowband for transmitting the first TB in each time unit used during the transmission of the first TB.

The first frequency hopping rule is: A narrowband index is determined according to a function $F1(x)$.

The second frequency hopping rule is: A narrowband index is determined according to a function $F2(x, y)$.

x is one or more parameters used in the function, and the parameter includes a variable and/or a constant.

y is a predefined constant, or y is a constant determined based on at least one of the quantity of narrowbands performing frequency hopping and the quantity of TBs scheduled by the control information.

An embodiment of this application further provides a communications device. The communications device is specifically a second communications device, and the second communications device includes a processing module and a transceiver module.

The processing module is configured to send control information to a first communications device. The control information is used to schedule a plurality of transport blocks TBs.

The processing module is configured to: when the control information enables frequency hopping, determine a narrowband for transmitting a first TB in each time unit used during transmission of the first TB in each time unit, used to transmit the first TB. The first TB is at least one of the plurality of TBs scheduled by the control information.

The processing module is configured to: if a quantity of narrowbands performing frequency hopping is an even quantity and an odd quantity of TBs are scheduled by the control information, determine, according to a first frequency hopping rule, the narrowband for transmitting the first TB in each time unit used during the transmission of the first TB.

The processing module is configured to: if a quantity of narrowbands performing frequency hopping is an even quantity and an even quantity of TBs are scheduled by the control information, determine, according to a second frequency hopping rule, the narrowband for transmitting the first TB in each time unit used during the transmission of the first TB.

The first frequency hopping rule is: A narrowband index is determined according to a function $F1(x)$.

The second frequency hopping rule is: A narrowband index is determined according to a function $F2(x, y)$.

x is one or more parameters used in the function, and the parameter includes a variable and/or a constant.

y is a predefined constant, or y is a constant determined based on at least one of the quantity of narrowbands performing frequency hopping and the quantity of TBs scheduled by the control information.

An embodiment of this application further provides a communications device. The communications device is specifically a first communications device, and the first communications device includes a processing module and a transceiver module.

A first communications device receives control information sent by a second communications device. The control information is used to schedule a plurality of transport blocks TBs.

The first communications device determines a first value, and uses or does not use, based on the first value, discontinuous transmission of a plurality of TBs.

The first communications device transmits, based on the first value, the plurality of TBs on transmission resources used for the transmission of the plurality of TBs.

An embodiment of this application further provides a communications device. The communications device is specifically a second communications device, and the second communications device includes a processing module and a transceiver module.

The second communications device sends control information to a first communications device. The control information is used to schedule a plurality of transport blocks TBs.

The second communications device determines a first value, and uses or does not use, based on the first value, discontinuous transmission of a plurality of TBs.

The second communications device transmits, based on the first value, the plurality of TBs on transmission resources used for the transmission of the plurality of TBs.

It should be noted that content such as information exchange between the modules/units of the apparatus and the execution processes thereof is based on a same concept as the method embodiments of this application, and achieves same technical effects as the method embodiments of this application. For specific content, refer to the foregoing description in the method embodiments of this application. Details are not described herein again.

An embodiment of this application further provides a computer storage medium. The computer storage medium stores a program. The program is executed to perform some or all of the steps recorded in the method embodiments.

Figure 12:
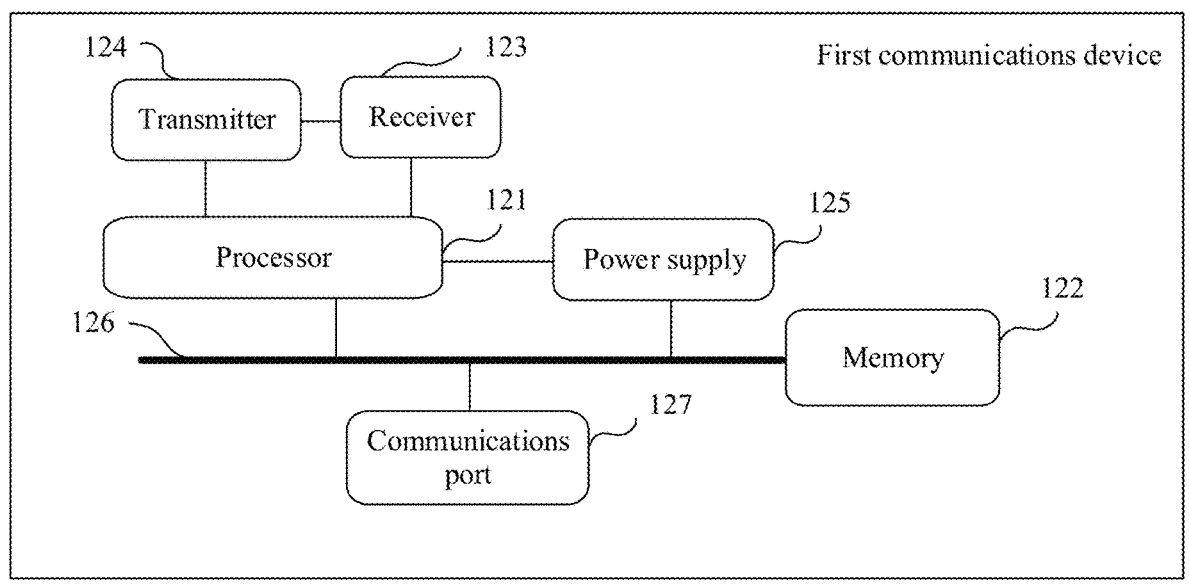
FIG. 12 is a schematic diagram of a composition structure of a first communications device according to an embodiment of this application.

FIG. 12 is a schematic diagram of a composition structure of another device according to an embodiment of this application. The device is a first communications device, and the first communications device may include a processor 121 (for example, a CPU), a memory 122, a transmitter 124, and a receiver 123. The transmitter 124 and the receiver 123 are coupled to the processor 121, and the processor 121 controls a sending action of the transmitter 124 and a receiving action of the receiver 123. The memory 122 may include a high-speed RAM memory, or may further include a non-volatile memory NVM, for example, at least one magnetic disk memory. The memory 122 may store various instructions, to complete various processing functions and implement the method steps in the embodiments of this application. Optionally, the first communications device in this embodiment of this application may further include one or more of a power supply 125, a communications bus 126, and a communications port 127. The receiver 123 and the transmitter 124 may be integrated into a transceiver of the first communications device, or may be independent receive and transmit antennas of the first communications device. The communications bus 126 is configured to implement a communications connection between elements. The communications port 127 is configured to implement a communications connection between the first communications device and another peripheral.

In this embodiment of this application, the memory 122 is configured to store computer-executable program code, and the program code includes instructions. When the processor 121 executes the instructions, the instructions enable the processor 121 to perform a processing action of the first communications device in the foregoing method embodiment, and enable the transmitter 124 to perform a sending action of the first communications device in the foregoing method embodiment. Implementation principles and technical effects thereof are similar, and details are not described herein again.

Figure 13:
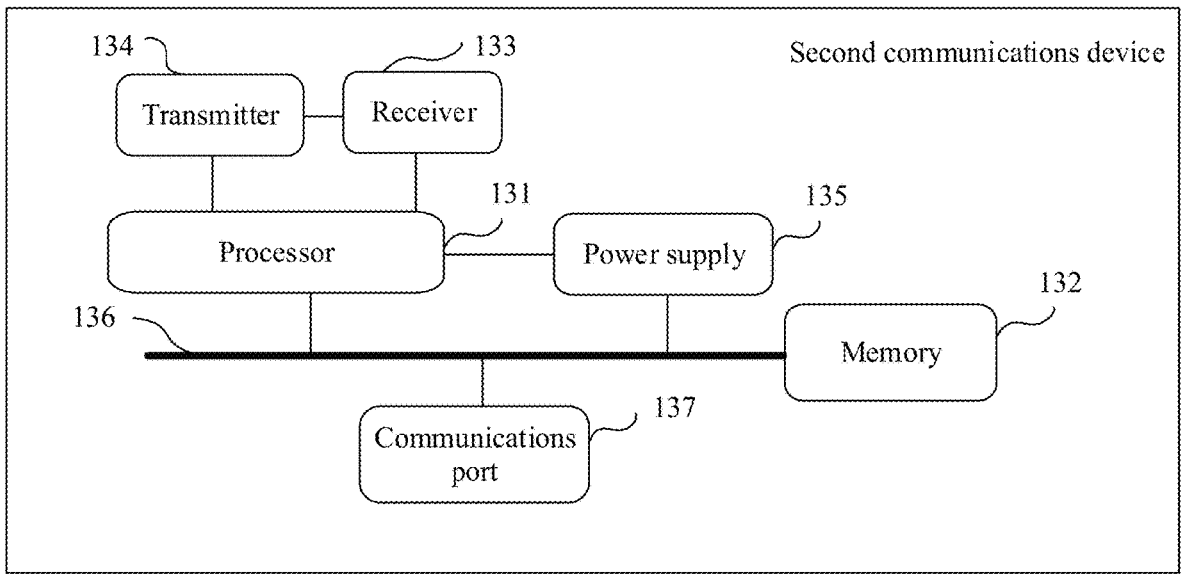
FIG. 13 is a schematic diagram of a composition structure of a second communications device according to an embodiment of this application.

FIG. 13 is a schematic diagram of a composition structure of another device according to an embodiment of this application. The device is a second communications device, and the second communications device may include a processor 131 (for example, a CPU), a memory 132, a receiver 133, and a transmitter 134. The receiver 133 and the transmitter 134 are coupled to the processor 131, and the processor 131 controls a receiving action of the receiver 133 and a sending action of the transmitter 134. The memory 132 may include a high-speed RAM memory, or may further include a non-volatile memory NVM, for example, at least one magnetic disk memory. The memory 132 may store various instructions, to complete various processing functions and implement the method steps in the embodiments of this application. Optionally, the second communications device in this embodiment of this application may further include one or more of a power supply 135, a communications bus 136, and a communications port 137. The receiver 133 and the transmitter 134 may be integrated into a transceiver of the second communications device, or may be independent receive and transmit antennas of the second communications device. The communications bus 136 is configured to implement a communications connection between elements. The communications port 137 is configured to implement a communications connection between the second network device and another peripheral device.

In another possible design, when the communications device is a terminal device or a chip in a network device, the chip includes a processing unit and a communications unit. The processing unit may be, for example, a processor. The communications unit may be, for example, an input/output interface, a pin, or a circuit. The processing unit may execute computer-executable instructions stored in a storage unit, so that a chip in the terminal performs the wireless communications method according to any one implementation of the first aspect. Optionally, the storage unit is a storage unit in the chip, for example, a register or a cache. Alternatively, the storage unit may be a storage unit that is in the terminal and that is located outside the chip, for example, a read-only memory (read-only memory, ROM) or another type of static storage device that may store static information and instructions, for example, a random access memory (random access memory, RAM).

The processor mentioned in any of the foregoing designs may be a general-purpose central processing unit (CPU), a microprocessor, an application-specific integrated circuit (application-specific integrated circuit, ASIC), or one or more integrated circuits for controlling program execution of the wireless communications method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected based on an actual need to achieve the objectives of the solutions of the embodiments. In addition, in the accompanying drawings of the apparatus embodiments provided in this application, connection relationships between modules indicate that the modules have communications connections with each other, which may be specifically implemented as one or more communications buses or signal cables. A person of ordinary skill in the art may understand and implement the embodiments without creative efforts.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, a dedicated circuit, or the like. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

What is claimed is:

1. An information transmission method, comprising:
receiving, by a first communications device, control information sent by a second communications device, wherein the control information is used to schedule a plurality of transport blocks (TBs);
determining, by the first communications device, a first value, wherein the first value is associated with a quantity of the plurality of TBs and one or more of: a frequency hopping configuration parameter; a redundancy version (RV) change parameter; and an interleaving gap parameter;
determining, by the first communications device based on the determined first value, a first start time unit for a first TB to be transmitted by the first communications device, wherein the first TB is at least one of the plurality of TBs scheduled by the control information, and an index of the first start time unit is an integer multiple of the determined first value; and
transmitting, by the first communications device, the first TB based on the determined first start time unit;
wherein the first value includes a product of a frequency hopping gap in the frequency hopping configuration and the quantity of the plurality of TBs; or
wherein the first value includes a product of an RV change gap in the RV change parameter and the quantity of the plurality of TBs.

2. The method according to claim 1, wherein the transmitting, by the first communications device, the first TB based on the determined first start time unit comprises:
determining, by the first communications device based on an end time unit of a control channel and a preset first delay, a second start time unit for the transmission of the first TB; and
transmitting, by the first communications device, the first TB based on first indication information comprised in the control information, wherein the first indication information indicates that the first TB is transmitted in a first manner, and wherein:
the first manner comprises:
if an index of the second start time unit is not an integer multiple of the first value, the transmission of the first TB is delayed to the first start time unit closest to the second start time unit to transmit the first TB; and
if an index of the second start time unit is an integer multiple of the first value, the second start time unit is equal to the first start time unit, and the first TB is transmitted based on the first start time unit.

3. The method according to claim 1, wherein the method further comprises:
determining, by the first communications device based on an end time unit of a control channel and a preset first delay, a second start time unit for the transmission of the first TB, wherein if an index of the second start time unit is not an integer multiple of the first value, the transmission of the first TB is delayed to the first start time unit closest to the second start time unit to transmit the first TB.

4. A communications device, wherein the communications device is a first communications device, and the first communications device comprises:
a transceiver, the transceiver configured to receive control information sent by a second communications device, wherein the control information is used to schedule a plurality of transport blocks (TBs);
at least one processor; and
one or more memories coupled to the at least one processor and storing programming instructions for execution by the at least one processor to:
determine a first value, wherein the first value is associated with a quantity of the plurality of TBs and one or more of: a frequency hopping configuration parameter; a redundancy version (RV) change parameter; and an interleaving gap parameter;
determine, based on the determined first value, a first start time unit for a first TB to be transmitted by the communications device, wherein the first TB is at least one of the plurality of TBs scheduled by the control information, and an index of the first start time unit is an integer multiple of the determined first value; and
transmit, by using the transceiver, the first TB based on the determined first start time unit;
wherein the first value includes a product of a frequency hopping gap in the frequency hopping configuration and the quantity of the plurality of TBs; or
wherein the first value includes a product of an RV change gap in the RV change parameter and the quantity of the plurality of TBs.

5. The communications device according to claim 4, wherein the programming instructions are for execution by the at least one processor to:
determine, based on an end time unit of a control channel and a preset first delay, a second start time unit for the transmission of the first TB; and
transmit, by using the transceiver, the first TB based on first indication information comprised in the control information, wherein the first indication information indicates that the first TB is transmitted in a first manner, and wherein:
the first manner comprises:
if an index of the second start time unit is not an integer multiple of the first value, the transmission of the first TB is delayed to the first start time unit closest to the second start time unit to transmit the first TB; and
if an index of the second start time unit is an integer multiple of the first value, the second start time unit is equal to the first start time unit, and the first TB is transmitted based on the first start time unit.

6. The communications device according to claim 4, wherein the programming instructions are for execution by the at least one processor to:
determine, based on an end time unit of a control channel and a preset first delay, a second start time unit for the transmission of the first TB, wherein if an index of the second start time unit is not an integer multiple of the first value, the transmission of the first TB is delayed to the first start time unit closest to the second start time unit to transmit the first TB.

7. The method according to claim 1, wherein the transmitting, by the first communications device, the first TB based on the determined first start time unit comprises:
determining, by the first communications device based on an end time unit of a control channel and a preset first delay, a second start time unit for the transmission of the first TB; and
transmitting, by the first communications device, the first TB based on first indication information comprised in the control information, wherein the first indication information indicates that the first TB is transmitted in a second manner, and wherein:

the second manner comprises:
the first TB is transmitted based on the second start time unit.

8. The communications device according to claim 4, wherein the programming instructions are for execution by the at least one processor to:
determine, based on an end time unit of a control channel and a preset first delay, a second start time unit for the transmission of the first TB; and
transmit, by using the transceiver, the first TB based on first indication information comprised in the control information, wherein the first indication information indicates that the first TB is transmitted in a second manner, and wherein:
the second manner comprises:
the first TB is transmitted based on the second start time unit.

9. A non-transitory computer-readable storage media comprising instructions which, when executed by one or more processors of a first communications device, cause the one or more processors to perform operations comprising:
receiving control information sent by a second communications device, wherein the control information is used to schedule a plurality of transport blocks (TBs);
determining a first value, wherein the first value is associated with a quantity of the plurality of TBs and one or more of: a frequency hopping configuration parameter; a redundancy version (RV) change parameter; and an interleaving gap parameter;
determining, based on the determined first value, a first start time unit for a first TB to be transmitted by the first communications device, wherein the first TB is at least one of the plurality of TBs scheduled by the control information, and an index of the first start time unit is an integer multiple of the determined first value; and
transmitting the first TB based on the determined first start time unit;
wherein the first value includes a product of a frequency hopping gap in the frequency hopping configuration and the quantity of the plurality of TBs; or
wherein the first value includes a product of an RV change gap in the RV change parameter and the quantity of the plurality of TBs.

10. The non-transitory computer-readable storage media according to claim 9, wherein the transmitting the first TB based on the determined first start time unit comprises:
determining, based on an end time unit of a control channel and a preset first delay, a second start time unit for the transmission of the first TB; and
transmitting the first TB based on first indication information comprised in the control information, wherein the first indication information indicates that the first TB is transmitted in a first manner, and wherein:
the first manner comprises:
if an index of the second start time unit is not an integer multiple of the first value, the transmission of the first TB is delayed to the first start time unit closest to the second start time unit to transmit the first TB; and
if an index of the second start time unit is an integer multiple of the first value, the second start time unit is equal to the first start time unit, and the first TB is transmitted based on the first start time unit.

11. The non-transitory computer-readable storage media according to claim 9, wherein the operations further comprise:
determining, based on an end time unit of a control channel and a preset first delay, a second start time unit for the transmission of the first TB, wherein if an index of the second start time unit is not an integer multiple of the first value, the transmission of the first TB is delayed to the first start time unit closest to the second start time unit to transmit the first TB.

12. The non-transitory computer-readable storage media according to claim 9, wherein the transmitting the first TB based on the determined first start time unit comprises:
determining, based on an end time unit of a control channel and a preset first delay, a second start time unit for the transmission of the first TB; and
transmitting the first TB based on first indication information comprised in the control information, wherein the first indication information indicates that the first TB is transmitted in a second manner, and wherein:
the second manner comprises:
the first TB is transmitted based on the second start time unit.

* * * * *